(12) United States Patent
Yoshida et al.

(10) Patent No.: US 11,773,971 B2
(45) Date of Patent: Oct. 3, 2023

(54) VEHICULAR CONTINUOUSLY VARIABLE TRANSMISSION, VEHICLE EQUIPPED WITH VEHICULAR CONTINUOUSLY VARIABLE TRANSMISSION, AND METHOD OF CONTROLLING VEHICULAR CONTINUOUSLY VARIABLE TRANSMISSION

(71) Applicant: HONDA MOTOR CO., LTD., Tokyo (JP)

(72) Inventors: Hideaki Yoshida, Tokyo (JP); Ukyo Ogata, Tokyo (JP); Atsushi Okabe, Tokyo (JP); Hikaru Asai, Tokyo (JP); Takeshi Kurata, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 196 days.

(21) Appl. No.: 17/537,555

(22) Filed: Nov. 30, 2021

(65) Prior Publication Data

US 2022/0170544 A1 Jun. 2, 2022

(30) Foreign Application Priority Data

Dec. 1, 2020 (JP) .................................. 2020-199308

(51) Int. Cl.
*F16H 61/662* (2006.01)

(52) U.S. Cl.
CPC . *F16H 61/66259* (2013.01); *F16H 61/66272* (2013.01); *F16H 2061/66277* (2013.01); *F16H 2061/66281* (2013.01)

(58) Field of Classification Search
CPC .................... F16H 61/662–2061/66295; F16H 61/12–2061/1296; B60W 10/107; B60W 10/04–08; B60W 2510/1075–1085
See application file for complete search history.

(56) References Cited

U.S. PATENT DOCUMENTS

2020/0158237 A1\* 5/2020 Toshizane ............... F16H 61/12

FOREIGN PATENT DOCUMENTS

| EP | 2650571 B1 \* | 6/2017 | ....... F16H 61/66272 |
| JP | 2004-076906 | 3/2004 | |
| JP | 2010249004 A \* | 11/2010 | |

\* cited by examiner

*Primary Examiner* — David R Morris
(74) *Attorney, Agent, or Firm* — AMIN, TUROCY & WATSON, LLP

(57) ABSTRACT

A belt-type continuously variable transmission includes an actual gear ratio calculation unit for calculating an actual gear ratio based on the rotation speed of a drive pulley and the rotation speed of a driven pulley, a reference gear ratio calculation unit for calculating a reference gear ratio by modifying the actual gear ratio based on an input torque and a driven pulley hydraulic pressure, and a condition determination unit for, in a case where the target gear ratio is an overdrive gear ratio, determining that at least part of rings of a belt is missing when the reference gear ratio is greater than or equal to a predetermined gear ratio and a drive pulley hydraulic pressure is greater than or equal to a predetermined hydraulic pressure.

9 Claims, 16 Drawing Sheets

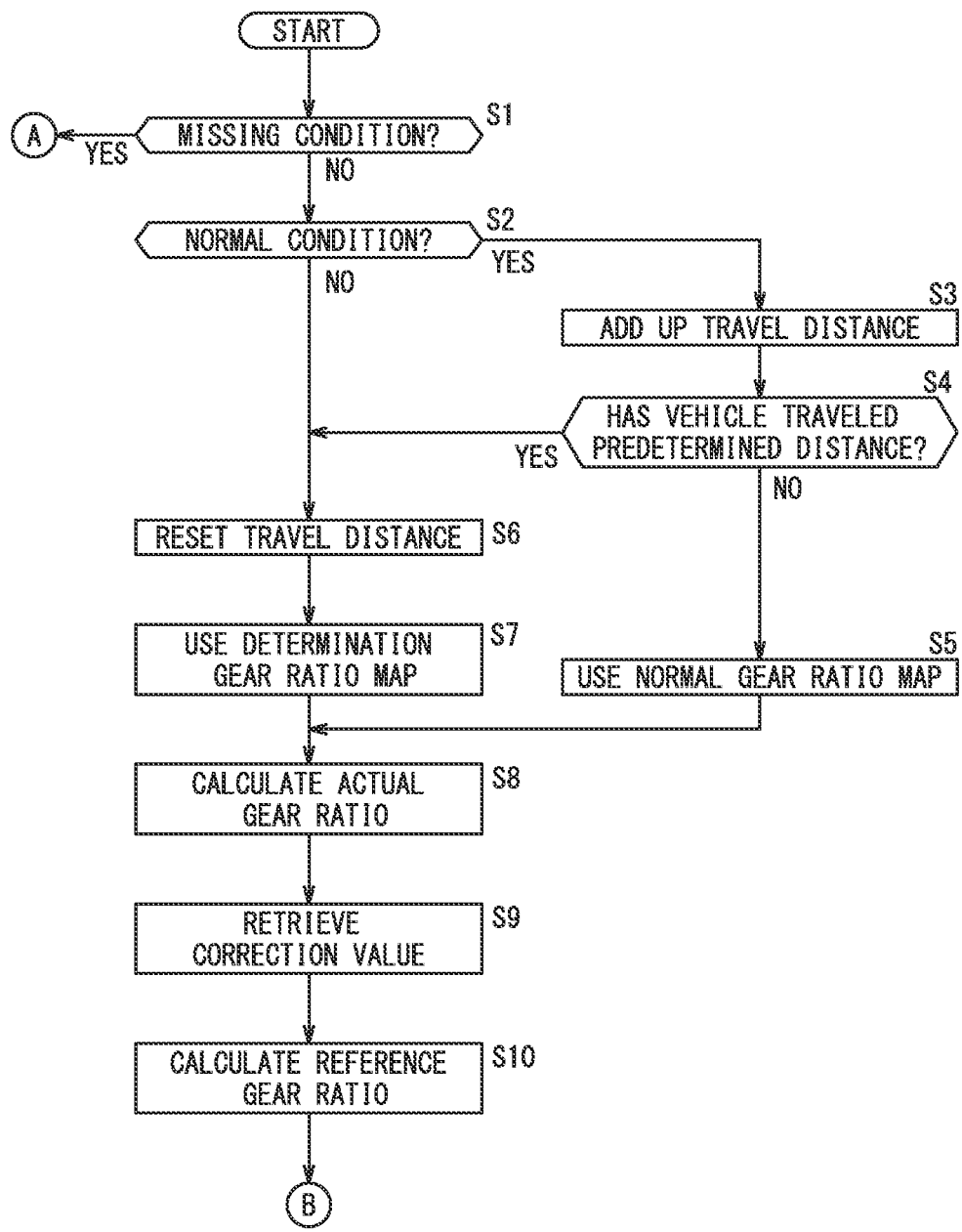

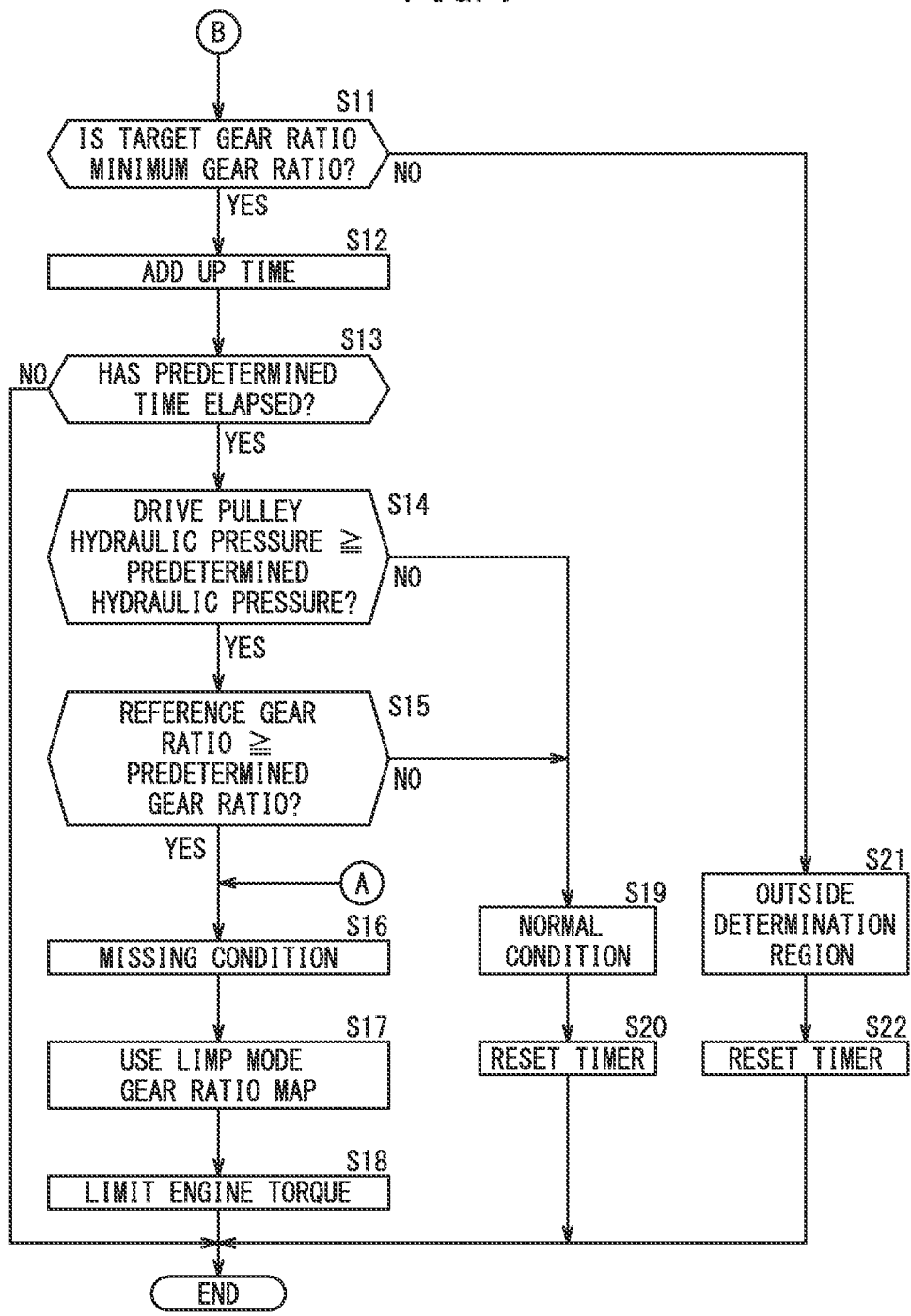

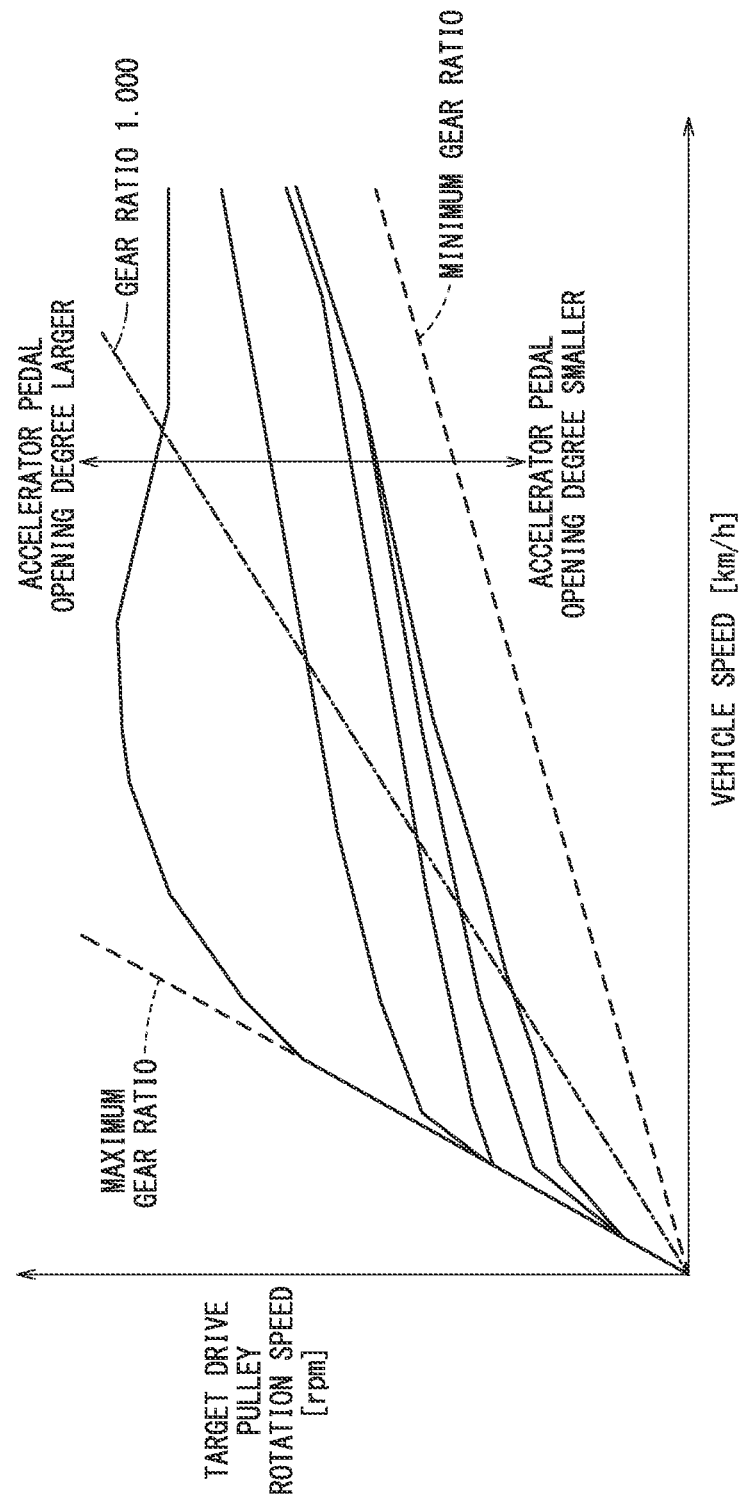

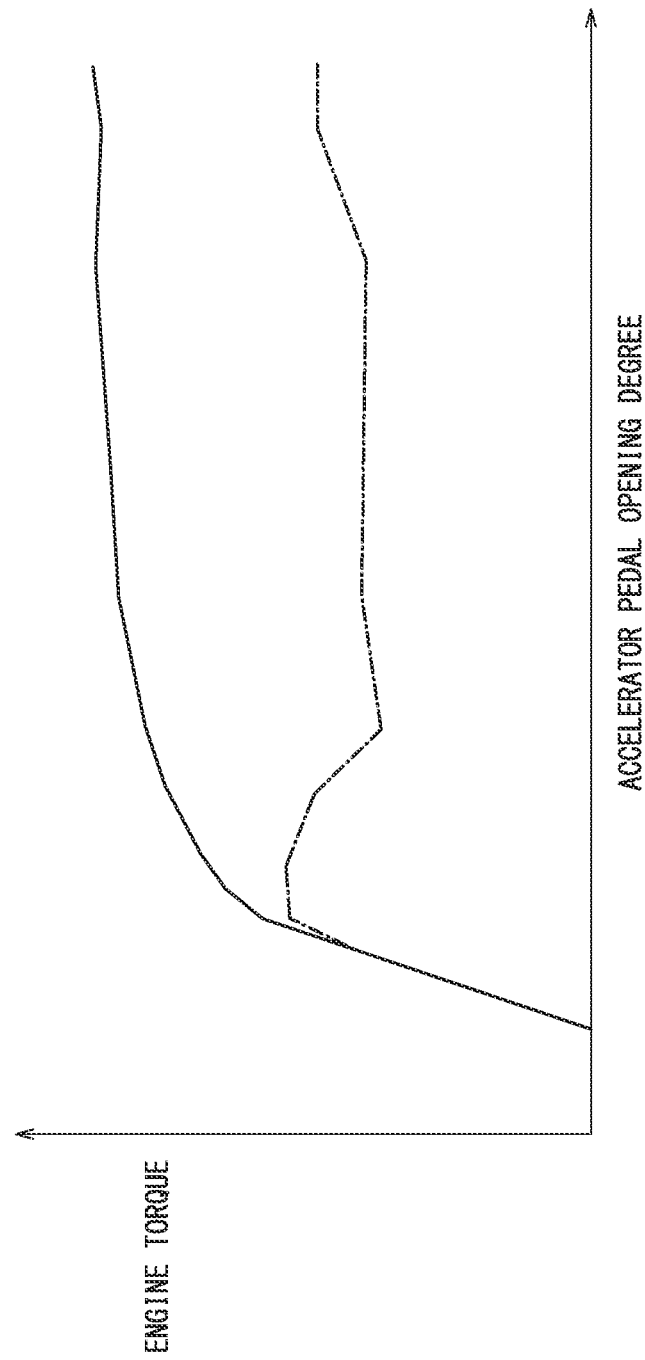

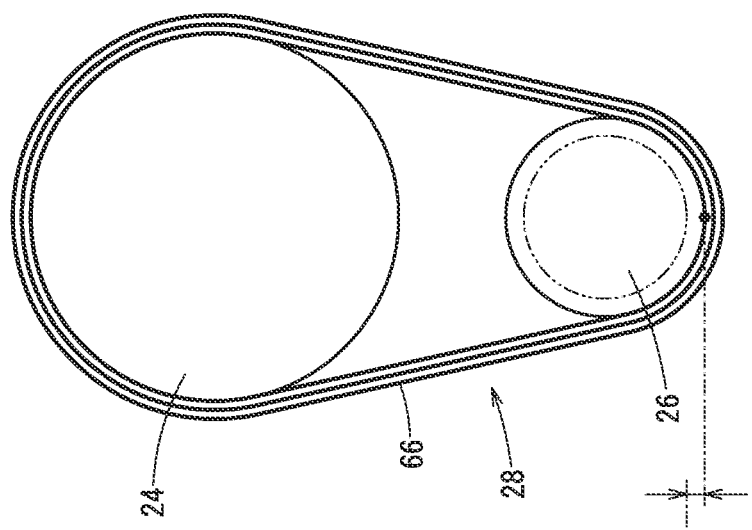
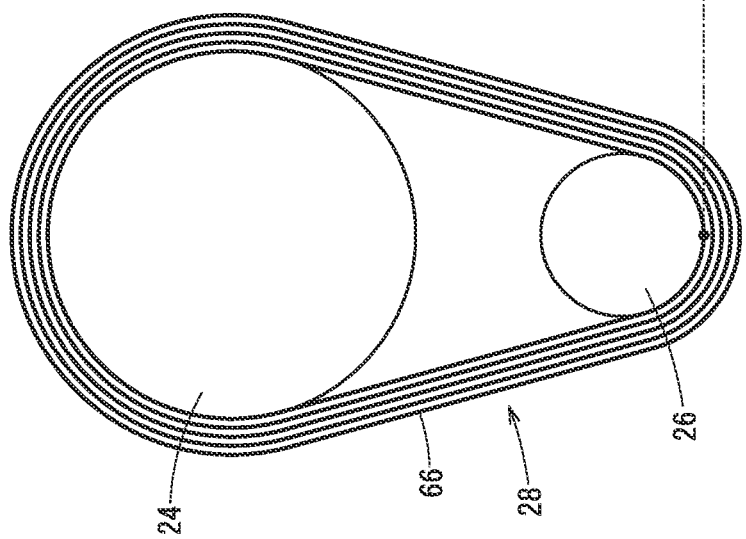

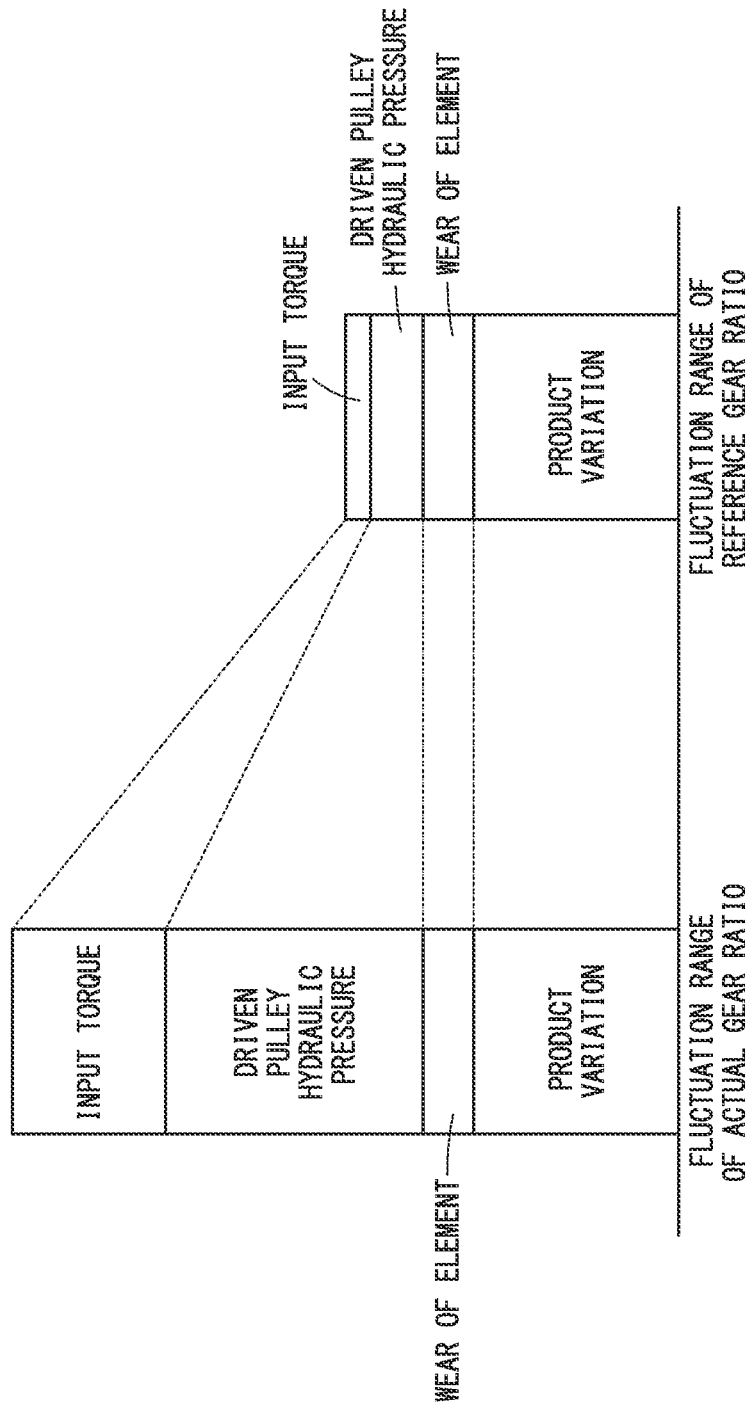

VEHICULAR CONTINUOUSLY VARIABLE TRANSMISSION, VEHICLE EQUIPPED WITH VEHICULAR CONTINUOUSLY VARIABLE TRANSMISSION, AND METHOD OF CONTROLLING VEHICULAR CONTINUOUSLY VARIABLE TRANSMISSION

CROSS-REFERENCE TO RELATED APPLICATIONS

This application is based upon and claims the benefit of priority from Japanese Patent Application No. 2020-199308 filed on Dec. 1, 2020, the contents of which are incorporated herein by reference.

BACKGROUND OF THE INVENTION

Field of the Invention

The present invention relates to a vehicular continuously variable transmission, a vehicle equipped with a vehicular continuously variable transmission, and a method of controlling a vehicular continuously variable transmission.

Description of the Related Art

JP 2004-076906 A discloses a belt-type continuously variable transmission. This belt-type continuously variable transmission determines whether or not an abnormality such as stretching (slack) of the belt has occurred. The belt-type continuously variable transmission is determined to be abnormal when the actual gear ratio is greater than the gear ratio occurring in the maximum speed-increasing state even though the command signal for setting the maximum speed-increasing state is output.

SUMMARY OF THE INVENTION

The gear ratio of the belt type continuously variable transmission in the maximum speed-increasing state changes depending on the input torque input to the belt type continuously variable transmission and the hydraulic pressure (hydraulic oil pressure) supplied to the driven pulley. For this reason, the technique disclosed in JP 2004-076906 A has a problem in that it is not possible to accurately determine that an abnormality has occurred in the belt.

An object of the present invention is to solve the above-described problems.

According to a first aspect of the present invention, there is provided a vehicular continuously variable transmission that continuously varies a gear ratio of a vehicle by varying a winding diameter of a belt wound around a drive pulley and a driven pulley, the vehicular continuously variable transmission including: a target gear ratio setting unit configured to set a target gear ratio; a gear ratio control unit configured to output a command value of a drive pulley hydraulic pressure supplied to the drive pulley and a command value of a driven pulley hydraulic pressure supplied to the driven pulley, based on an input torque input to the vehicular continuously variable transmission and the target gear ratio; a hydraulic pressure detecting unit configured to detect the driven pulley hydraulic pressure; a first rotation speed detecting unit configured to detect a rotation speed of the drive pulley; a second rotation speed detecting unit configured to detect a rotation speed of the driven pulley; an actual gear ratio calculation unit configured to calculate an actual gear ratio based on the rotation speed of the drive pulley and the rotation speed of the driven pulley; a reference gear ratio calculation unit configured to calculate a reference gear ratio by modifying the actual gear ratio, based on the input torque and the driven pulley hydraulic pressure; and a condition determination unit configured to, in a case where the target gear ratio is an overdrive gear ratio, determine that at least part of rings of the belt is missing when the reference gear ratio is equal to or greater than a predetermined gear ratio and the drive pulley hydraulic pressure is equal to or greater than a first predetermined hydraulic pressure.

According to a second aspect of the present invention, there is provided a vehicle including the vehicular continuously variable transmission of the above first aspect, the vehicle including: an engine control unit configured to control engine torque output from an engine, in accordance with an accelerator pedal opening degree, wherein, in a case where it is determined that at least part of the rings is missing, the engine control unit controls the engine torque during acceleration of the vehicle to be smaller than that before it is determined that at least part of the rings is missing.

According to the third aspect of the present invention, there is provided a method of controlling a vehicular continuously variable transmission that continuously varies a gear ratio of the vehicle by varying a winding diameter of a belt wound around a drive pulley and a driven pulley. The vehicular continuously variable transmission includes: a hydraulic pressure detecting unit configured to detect a driven pulley hydraulic pressure supplied to the driven pulley; a first rotation speed detecting unit configured to detect a rotation speed of the drive pulley; a second rotation speed detecting unit configured to detect a rotation speed of the driven pulley. The method includes: setting a target gear ratio; outputting a command value of a drive pulley hydraulic pressure supplied to the drive pulley and a command value of the driven pulley hydraulic pressure based on an input torque input to the vehicular continuously variable transmission and the target gear ratio; calculating an actual gear ratio based on the rotation speed of the drive pulley and the rotation speed of the driven pulley; calculating a reference gear ratio by modifying the actual gear ratio based on the input torque and the driven pulley hydraulic pressure; and in a case where the target gear ratio is an overdrive gear ratio, determining that at least part of rings of the belt is missing when the reference gear ratio is equal to or greater than a predetermined gear ratio and the drive pulley hydraulic pressure is equal to or greater than a first predetermined hydraulic pressure.

According to the present invention, it is possible to highly accurately determine whether abnormality occurs in the belt.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 6 is a flowchart illustrating a belt condition determination process performed by a control device;

FIG. 7 is a flowchart illustrating a belt condition determination process performed by the control device;

FIG. 8 is a limp mode gear ratio map;

FIG. 9 is an engine torque map;

FIGS. 11A and 11B are schematic diagrams of a drive pulley, a driven pulley, and a belt;

FIG. 12 is a schematic diagram showing a comparison between a fluctuation range of an actual gear ratio and a fluctuation range of a reference gear ratio;

DESCRIPTION OF THE INVENTION

First Embodiment

Figure 1:
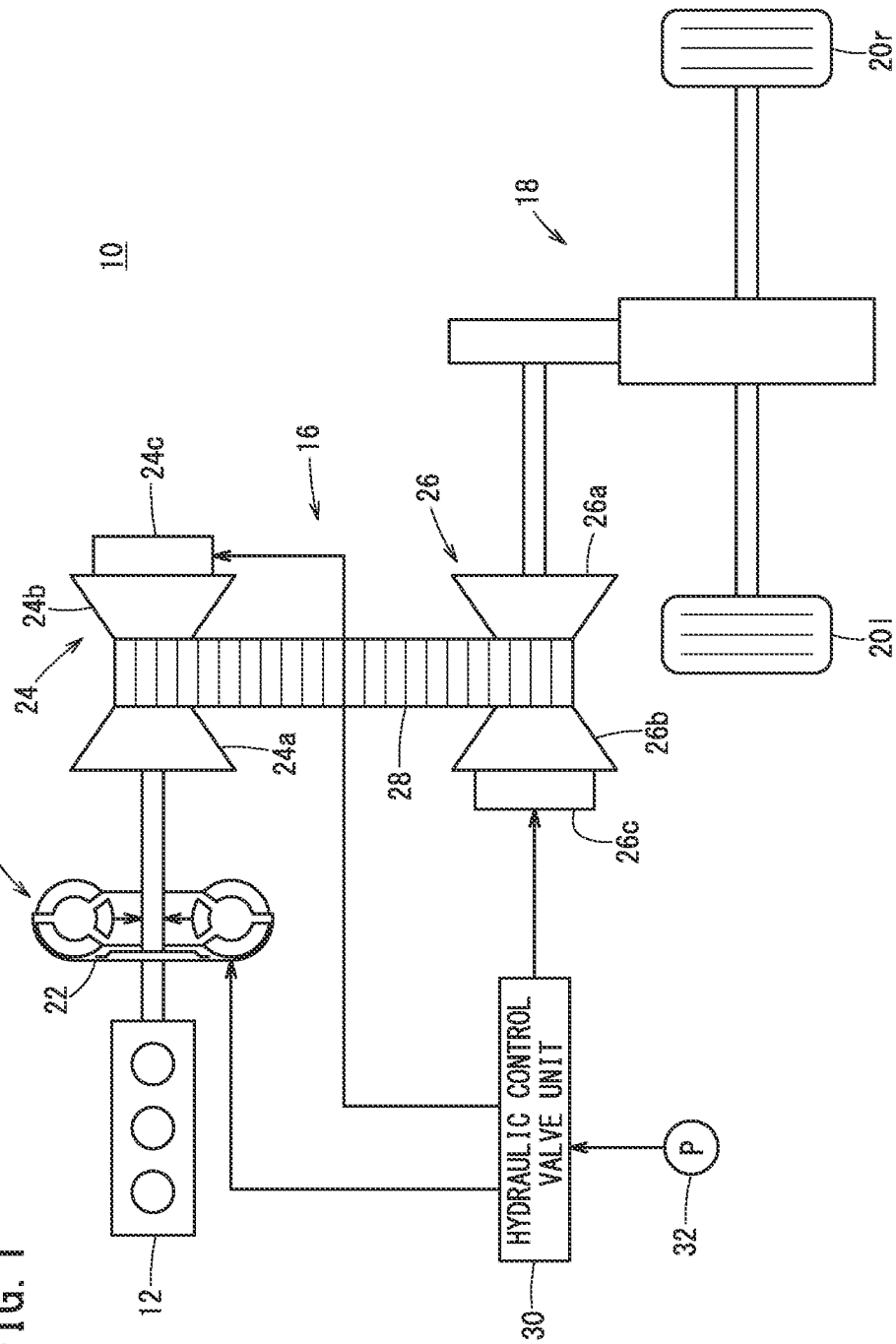
FIG. 1 is a schematic view of a vehicle.

FIG. 1 is a schematic diagram of a vehicle 10. The vehicle 10 includes an engine 12 as a drive source. The vehicle 10 may be a hybrid vehicle having a motor as a drive source in addition to the engine 12.

The engine torque output from the engine 12 is transmitted to left and right drive wheels 20*l* and 20*r* via a torque converter 14, a belt-type continuously variable transmission 16, and a final reduction gear 18. The torque converter 14 includes a lock-up clutch 22. The lock-up clutch 22 is controlled to a disengaged state and an engaged state by lock-up hydraulic pressure (hydraulic oil pressure) supplied from a hydraulic control valve unit 30. When the lock-up clutch 22 is in the disengaged state, the torque converter 14 functions as a fluid coupling and exhibits a torque amplifying function. When the lock-up clutch 22 is engaged, the input shaft and the output shaft of the torque converter 14 are directly connected to each other.

The belt-type continuously variable transmission 16 includes a drive pulley 24, a driven pulley 26, and a belt 28. The belt-type continuously variable transmission 16 corresponds to the vehicular continuously variable transmission (the continuously variable transmission for vehicle) of the present invention. The belt 28 is wound around the drive pulley 24 and the driven pulley 26.

The drive pulley 24 includes a fixed sheave 24*a*, a movable sheave 24*b*, and a drive oil chamber 24*c*. The movable sheave 24*b* is movable in the axial direction with respect to the fixed sheave 24*a*. Drive pulley hydraulic pressure for moving the movable sheave 24*b* is supplied (applied) to the drive oil chamber 24*c* (i.e., hydraulic oil is supplied to the drive oil chamber). The drive pulley hydraulic pressure is supplied from the hydraulic control valve unit 30 to the drive oil chamber 24*c*. Thus, the groove width between the fixed sheave 24*a* and the movable sheave 24*b* is made variable, whereby the winding diameter of the belt 28 with respect to the drive pulley 24 is made variable.

An axial movement range of the movable sheave 24*b* with respect to the fixed sheave 24*a* is restricted by a stopper (not shown). When the movable sheave 24*b* moves away from the fixed sheave 24*a* in the axial direction, a position where the movable sheave 24*b* abuts against the stopper is a position where the movable sheave 24*b* is farthest away from the fixed sheave 24*a*. At this time, the groove width between the fixed sheave 24*a* and the movable sheave 24*b* becomes maximum, and the winding diameter of the belt 28 with respect to the drive pulley 24 becomes minimum accordingly. Therefore, the gear ratio of the belt-type continuously variable transmission 16 becomes the maximum gear ratio. When the movable sheave 24*b* moves toward the fixed sheave 24*a* in the axial direction, a position where the movable sheave 24*b* abuts against the stopper is a position where the movable sheave 24*b* is closest to the fixed sheave 24*a*. At this time, the groove width between the fixed sheave 24*a* and the movable sheave 24*b* becomes minimum, and the winding diameter of the belt 28 with respect to the drive pulley 24 becomes maximum accordingly. Therefore, the gear ratio of the belt-type continuously variable transmission 16 becomes the minimum gear ratio.

The driven pulley 26 includes a fixed sheave 26*a*, a movable sheave 26*b*, and a driven oil chamber 26*c*. The movable sheave 26*b* is movable in the axial direction with respect to the fixed sheave 26*a*. The driven oil chamber 26*c* is supplied with a driven pulley hydraulic pressure for applying a clamping force for sandwiching the belt 28 between the fixed sheave 26*a* and the movable sheave 26*b*. The driven pulley hydraulic pressure is supplied from the hydraulic control valve unit 30, and a clamping force that sandwiches the belt 28 acts between the fixed sheave 26*a* and the movable sheave 26*b*. Accordingly, tension is applied to the belt 28, and a torque capacity corresponding to the clamping force is set in the belt-type continuously variable transmission 16.

The final reduction gear 18 reduces the speed of rotation output from the belt-type continuously variable transmission 16 and distributes drive torque to the left and right drive wheels 20*l* and 20*r*.

The hydraulic control valve unit 30 incorporates a plurality of solenoid valves (not shown). When the operating states of these solenoid valves are switched, the hydraulic oil supplied from an oil pump 32 is regulated to a lock-up hydraulic pressure, a drive pulley hydraulic pressure, and a driven pulley hydraulic pressure, and is supplied to each hydraulic device.

Figure 2:
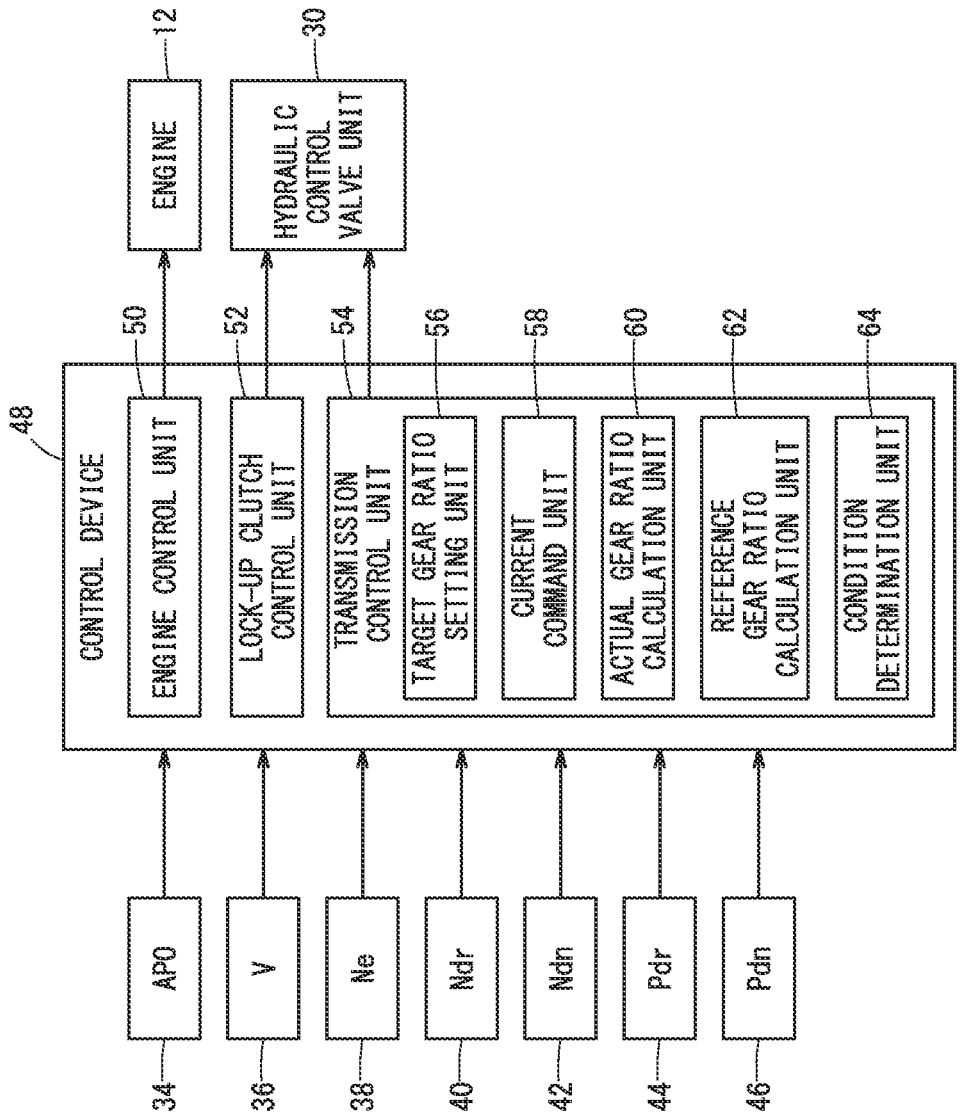
FIG. 2 is a block diagram showing a configuration of a control system of the vehicle.

FIG. 2 is a block diagram showing a configuration of a control system of the vehicle 10. The vehicle 10 includes an accelerator pedal opening sensor 34, a vehicle speed sensor 36, an engine speed sensor 38, a drive pulley speed sensor 40, a driven pulley speed sensor 42, a drive pulley hydraulic pressure sensor 44, a driven pulley hydraulic pressure sensor 46, and a control device 48.

The accelerator pedal opening sensor 34 detects an operation amount of an accelerator pedal (not shown). Hereinafter, the operation amount of the accelerator pedal may be referred to as an accelerator pedal opening degree. The vehicle speed sensor 36 detects a vehicle speed of the vehicle 10. The engine speed sensor 38 detects the rotation speed of the engine 12.

The drive pulley speed sensor 40 detects the rotation speed of the drive pulley 24. The drive pulley speed sensor 40 corresponds to a first rotation speed detecting unit of the present invention. The driven pulley speed sensor 42 detects the rotation speed of the driven pulley 26. The driven pulley speed sensor 42 corresponds to a second rotation speed detecting unit of the present invention. The drive pulley hydraulic pressure sensor 44 detects a drive pulley hydraulic pressure. The driven pulley hydraulic pressure sensor 46 detects the driven pulley hydraulic pressure. The driven pulley hydraulic pressure sensor 46 corresponds to a hydraulic pressure detecting unit of the present invention.

The control device 48 includes an engine control unit 50, a lock-up clutch control unit 52, and a transmission control unit 54.

The engine control unit 50 controls the engine 12 to output an engine torque corresponding to the accelerator pedal opening degree to the engine 12. The lock-up clutch control unit 52 outputs a current command value for controlling the operation state of each solenoid valve of the hydraulic control valve unit 30, to the hydraulic control valve unit 30. As a result, the lock-up clutch 22 is placed in a disengaged state or an engaged state in accordance with the vehicle speed.

The transmission control unit 54 controls the hydraulic control valve unit 30 to adjust the gear ratio of the hydraulic control valve unit 30 to a target gear ratio. The target gear ratio is set in accordance with the accelerator pedal opening degree and the vehicle speed. Further, the transmission control unit 54 determines the condition of the belt 28.

The transmission control unit 54 includes a target gear ratio setting unit 56, a current command unit 58, an actual gear ratio calculation unit 60, a reference gear ratio calculation unit 62, and a condition determination unit 64.

Figure 3:
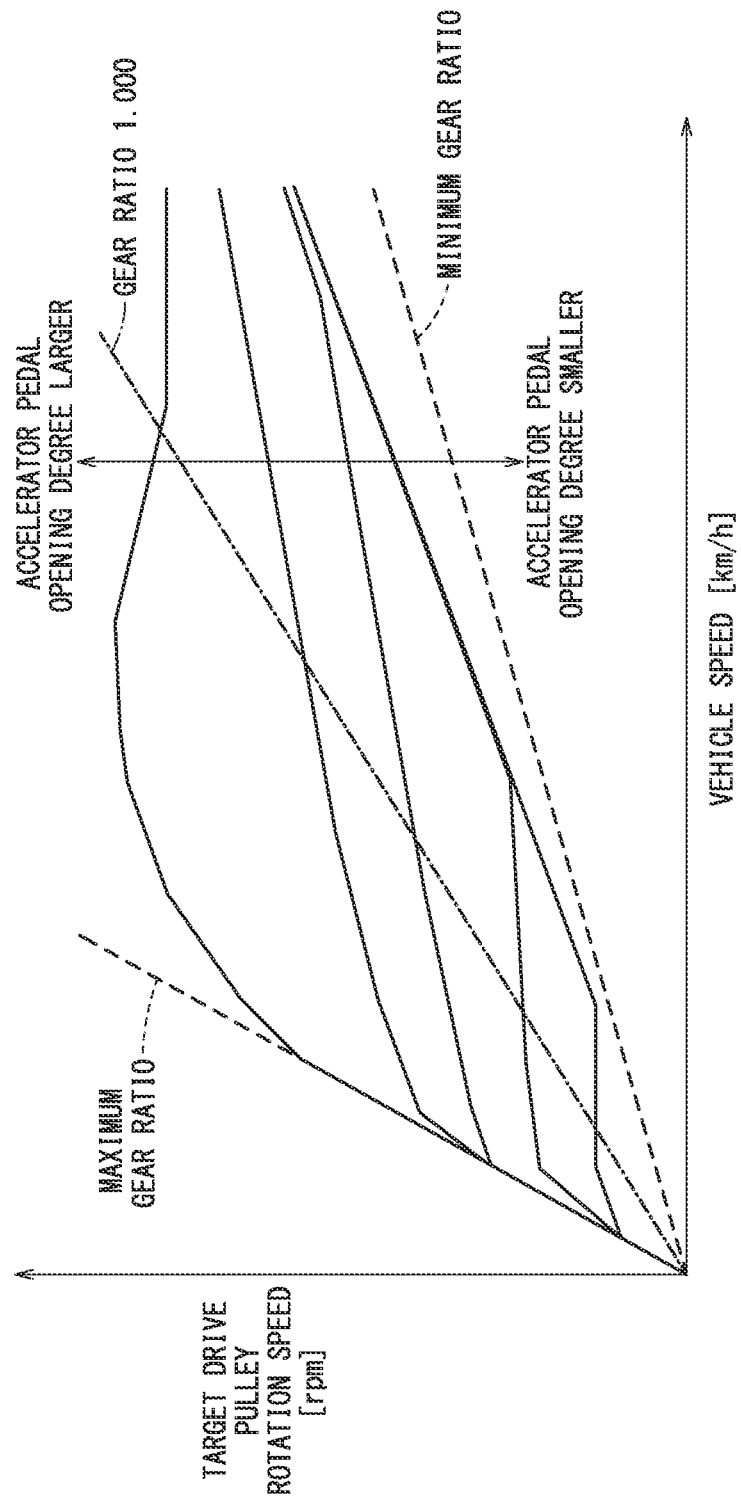
FIG. 3 is a normal gear ratio map.

The target gear ratio setting unit 56 sets the target gear ratio in accordance with the accelerator pedal opening degree and the vehicle speed. FIG. 3 is a gear ratio map. The target gear ratio setting unit 56 sets a target drive pulley rotation speed in accordance with the accelerator pedal opening degree and the vehicle speed, based on the gear ratio map. The rotation speed of the driven pulley 26 is uniquely determined from the vehicle speed. Therefore, setting the target drive pulley rotation speed is synonymous with setting the target gear ratio.

In the gear ratio map of FIG. 3, the minimum gear ratio and the maximum gear ratio that can be realized by the belt-type continuously variable transmission 16 are indicated by dash lines. In the gear ratio map of FIG. 3, the gear ratio of 1.000 is indicated by a dashed dotted line. In the gear ratio map of FIG. 3, the gear ratio in the region below the dashed dotted line is equal to or less than 1.000 and corresponds to an overdrive gear ratio (an overdrive state). In the gear ratio map of FIG. 3, even the smallest target gear ratio is set to a gear ratio greater than the minimum gear ratio.

Figure 4:
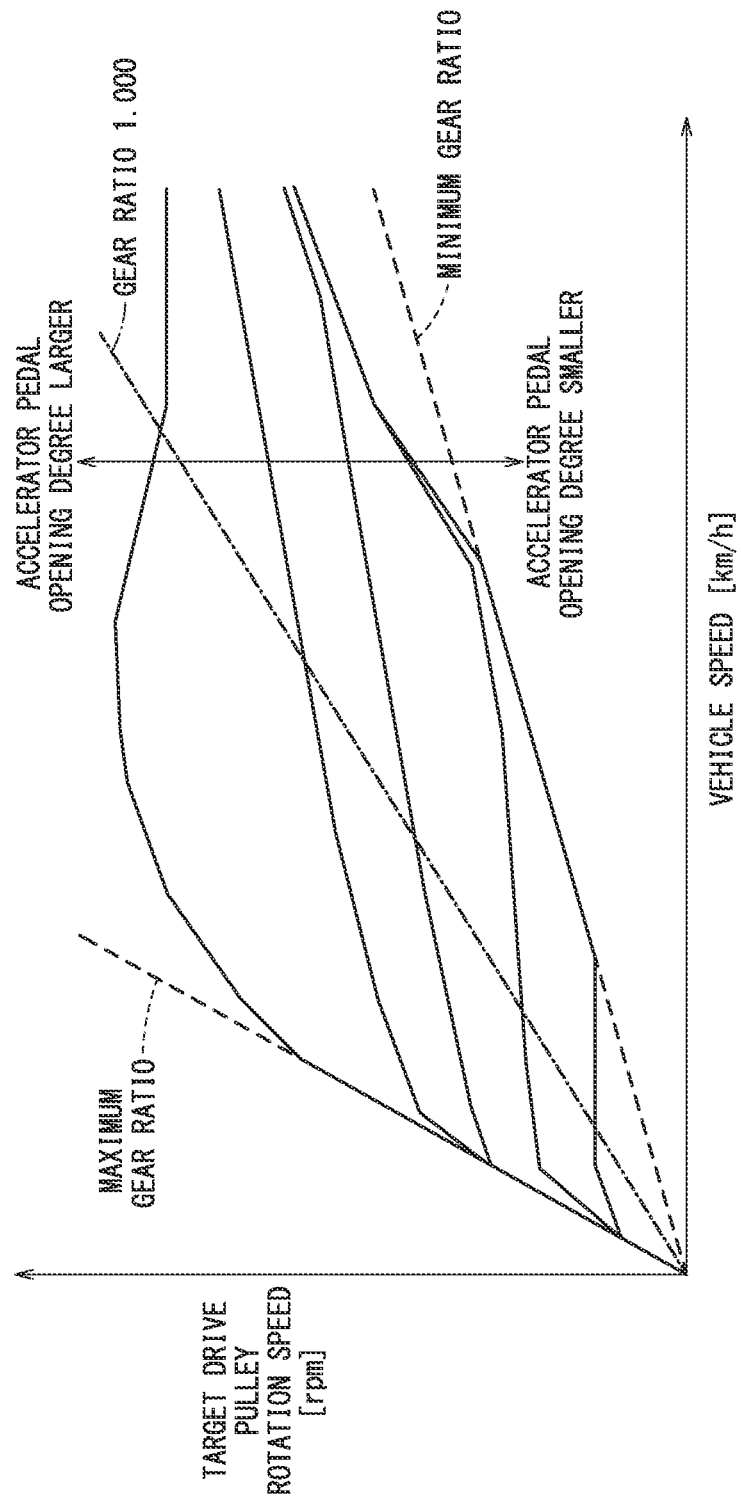
FIG. 4 is a gear ratio map for determination.

When determining the condition of the belt 28, which will be described later, the target gear ratio setting unit 56 sets the target gear ratio using a map different from the gear ratio map of FIG. 3. FIG. 4 is a gear ratio map used when the condition of the belt 28 is determined. In the gear ratio map of FIG. 4, the smallest target gear ratio is set to the minimum gear ratio. Hereinafter, the gear ratio map shown in FIG. 3 may be referred to as a normal gear ratio map, and the gear ratio map shown in FIG. 4 may be referred to as a gear ratio map for determination, which will be also simply referred to as a determination gear ratio map.

The current command unit 58 outputs, to the hydraulic control valve unit 30, a current command value for controlling the operation state of each solenoid valve of the hydraulic control valve unit 30. As a result, the gear ratio of the belt-type continuously variable transmission 16 is brought into the target gear ratio. The drive pulley hydraulic pressure and the driven pulley hydraulic pressure are controlled by the current command value. That is, the current command value can also be referred to as a command value for the drive pulley hydraulic pressure and a command value for the driven pulley hydraulic pressure. The current command unit 58 corresponds to a gear ratio control unit of the present invention.

The actual gear ratio calculation unit 60 calculates an actual gear ratio of the belt-type continuously variable transmission 16 based on the drive pulley rotation speed and the driven pulley rotation speed. The actual gear ratio is calculated by the following equation.

Actual gear ratio=drive pulley rotation speed/driven pulley rotation speed.

The reference gear ratio calculation unit 62 modifies the actual gear ratio occurring when the target gear ratio is the minimum gear ratio, and thereby calculates the reference gear ratio. The reference gear ratio is calculated by the following equation.

Reference gear ratio=actual gear ratio−correction value

Figure 5:
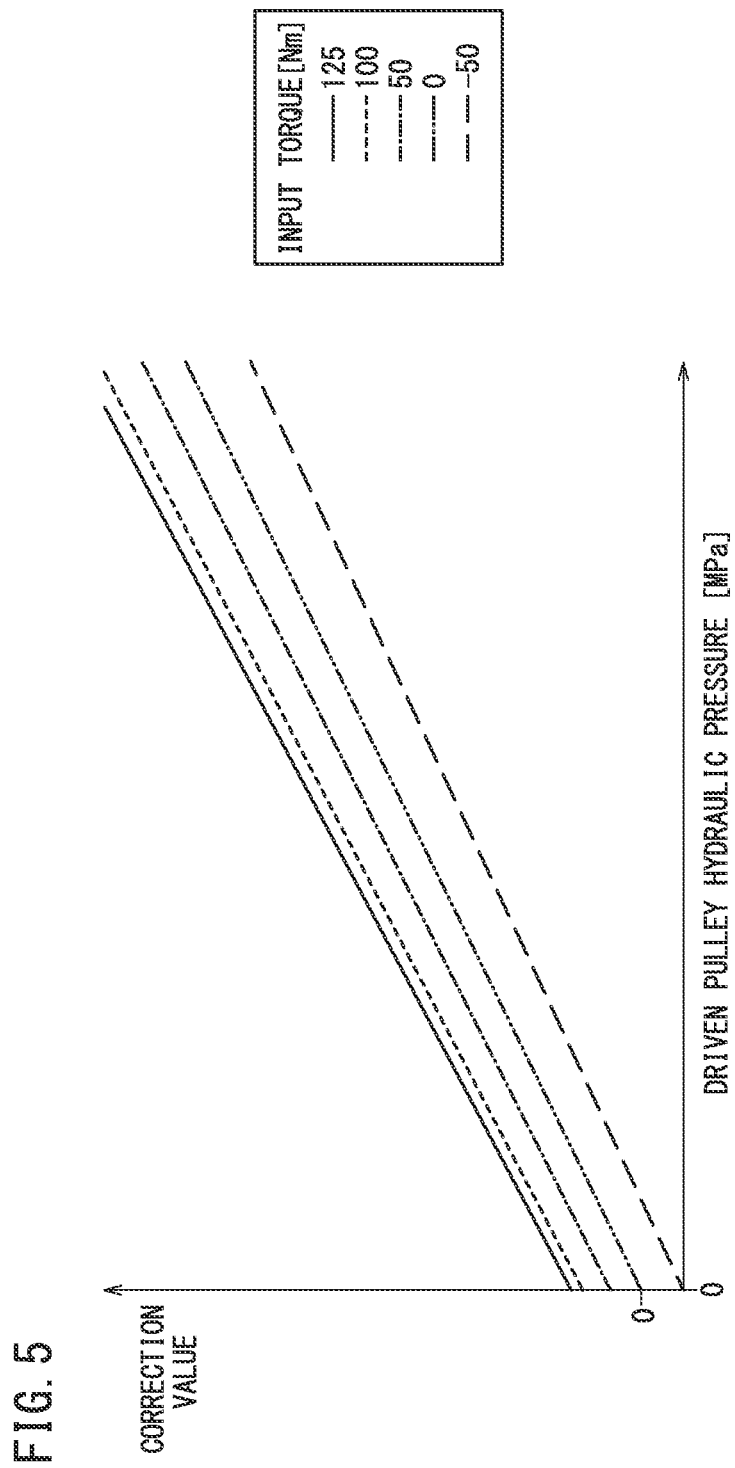
FIG. 5 is a correction value map.

FIG. 5 is a correction value map. The correction value is obtained based on the input torque input to the belt-type continuously variable transmission 16 and the driven pulley hydraulic pressure. The actual gear ratio changes according to the input torque and the driven pulley hydraulic pressure. For this reason, the reference gear ratio is calculated by subtracting, from the actual gear ratio, the variation amount that changes in accordance with the input torque and the driven pulley hydraulic pressure, as the correction value. In the present embodiment, the reference gear ratio is calculated as the gear ratio when the input torque is 0 [Nm] and the driven pulley hydraulic pressure is 0 [MPa]. The reference gear ratio is not limited to the case where the input torque is 0 [Nm] and the driven pulley hydraulic pressure is 0 [MPa], and may be calculated as a gear ratio at a predetermined input torque and driven pulley hydraulic pressure.

The condition determination unit 64 determines the condition of the belt 28 in accordance with the reference gear ratio obtained when the target gear ratio is the minimum gear ratio. The condition determination unit 64 determines, as the condition of the belt 28, a normal condition in which the belt 28 is normal and a missing condition in which part of the rings 66 of the belt 28 is missing.

The control device 48 includes a computer including an arithmetic processing device and a storage unit (not illustrated). The arithmetic processing device includes, for example, a processor such as a central processing unit (CPU) or a microprocessing unit (MPU), and a memory such as a ROM or a RAM. The storage unit is, for example, a hard disk, a solid state drive (SSD), or the like. The target gear ratio setting unit 56, the current command unit 58, the actual gear ratio calculation unit 60, the reference gear ratio calculation unit 62, and the condition determination unit 64 are realized by the arithmetic processing unit executing programs stored in the storage unit.

[Belt Condition Determination Process]

FIGS. 6 and 7 are flowcharts showing the belt condition determination process performed by the control device 48. The belt condition determination process is repeatedly executed at a predetermined cycle during an ON state of a start switch for starting the vehicle 10 or an ignition switch for starting the engine 12.

In step S1, the condition determination unit 64 determines whether or not the previous belt condition determination process determined that the condition of the belt 28 was in a missing condition. When the previous process determined that the belt condition was in a missing condition, the process proceeds to step S16, and when the previous process did not determine that the belt condition was in a missing condition, the process proceeds to step S2. That the previous belt condition determination process determined that the condition of the belt 28 was in a missing condition indicates that the previous belt condition determination process performed a process of step S16 described later.

In step S2, the condition determination unit 64 determines whether or not the previous belt condition determination process determined that the condition of the belt 28 was in a normal condition. When the previous process determined that the belt condition was in the normal condition, the process proceeds to step S3, and when the previous process did not determine that the belt condition was in the normal condition, the process proceeds to step S6. That the previous belt condition determination process determined that the condition of the belt 28 was in the normal condition indicates that the previous belt condition determination process performed a process of step S19 described later.

In step S3, the condition determination unit 64 accumulates (adds up) the travel distance of the vehicle 10 from the previous belt condition determination process up to the current belt condition determination process. Thereafter, the process proceeds to step S4.

In step S4, the condition determination unit 64 determines whether or not the vehicle 10 has traveled a predetermined distance. The process proceeds to step S6 when the vehicle 10 has traveled the predetermined distance, and when the vehicle 10 has not traveled the predetermined distance, the process proceeds to step S5. Whether or not the vehicle 10 has traveled the predetermined distance is determined based on the travel distance accumulated after reset of the travel distance in step S6 described later.

In step S5, the target gear ratio setting unit 56 sets the gear ratio map to be used, to the normal gear ratio map. Thereafter, the process proceeds to step S8.

In step S6, the condition determination unit 64 resets the travel distance of the vehicle 10. Thereafter, the process proceeds to step S7.

In step S7, the target gear ratio setting unit 56 sets the gear ratio map to be used, to the determination gear ratio map. Thereafter, the process proceeds to step S8.

In step S8, the actual gear ratio calculation unit 60 calculates the actual gear ratio of the belt-type continuously variable transmission 16 based on the drive pulley rotation speed and the driven pulley rotation speed. Thereafter, the process proceeds to step S9.

In step S9, the reference gear ratio calculation unit 62 retrieves a correction value corresponding to the input torque input to the belt-type continuously variable transmission 16 and the driven pulley hydraulic pressure, from the correction value map shown in FIG. 5. Thereafter, the process proceeds to step S10.

In step S10, the reference gear ratio calculation unit 62 calculates the reference gear ratio based on the actual gear ratio of the belt-type continuously variable transmission 16 and the correction value. Thereafter, the process proceeds to step S11.

In step S11, the condition determination unit 64 determines whether or not the target gear ratio is the minimum gear ratio. When the target gear ratio is the minimum gear ratio, the process proceeds to step S12. When the target gear ratio is not the minimum gear ratio, the process proceeds to step S21.

In step S12, the condition determination unit 64 accumulates (adds up), in a timer, the time from the previous belt condition determination process up to the current belt condition determination process. Thereafter, the process proceeds to step S13.

In step S13, the condition determination unit 64 determines whether or not a predetermined time has elapsed. Whether or not the predetermined time has elapsed is determined based on an elapsed time after reset of the timer in step S20 or step S22 described later. When the predetermined time has elapsed, the process proceeds to step S14. When the predetermined time has not elapsed, the belt condition determination process is terminated.

In step S14, the condition determination unit 64 determines whether or not the drive pulley hydraulic pressure is greater than or equal to a predetermined hydraulic pressure (i.e., whether the drive pulley hydraulic pressure Z the predetermined hydraulic pressure). When the drive pulley hydraulic pressure is equal to or higher than the predetermined hydraulic pressure, the process proceeds to step S15. When the drive pulley hydraulic pressure is lower than the predetermined hydraulic pressure, the process proceeds to step S19.

When the drive pulley hydraulic pressure is equal to or higher than the predetermined hydraulic pressure, the movable sheave 24b of the drive pulley 24 moves in a direction approaching the fixed sheave 24a, and the drive pulley hydraulic pressure is further applied in a state where the movable sheave 24b is in abutment against the stopper. This indicates a state in which the actual gear ratio cannot achieve the minimum gear ratio, which is the target gear ratio, even though the movable sheave 24b has moved to the position where the movable sheave 24b is in abutment against the stopper.

In step S15, the condition determination unit 64 determines whether or not the reference gear ratio is greater than or equal to a predetermined gear ratio (i.e., whether the reference gear ratio Z the predetermined gear ratio). If the reference gear ratio is greater than or equal to the predetermined gear ratio, the process proceeds to step S16. If the reference gear ratio is less than the predetermined gear ratio, the process proceeds to step S19. A method of setting the predetermined gear ratio will be described later in detail.

In step S16, the condition determination unit 64 determines that the condition of the belt 28 is in the missing condition. Thereafter, the process proceeds to step S17. If it is determined that the previous belt condition determination process determined that the condition of the belt 28 was in the missing condition, the process proceeds from step S1 to step S16. Then, the condition of the belt 28 is determined to be in the missing condition again. That is, once it is determined that the condition of the belt 28 is in the missing condition, the condition of the belt 28 continues to be determined to be in the missing condition, unless the user carries the vehicle 10 to a dealer or the like and the dealer or the like resets the belt condition determination process.

In step S17, the target gear ratio setting unit 56 sets the target gear ratio using the limp mode gear ratio map, and the process proceeds to step S18. FIG. 8 is a limp mode gear ratio map. As compared with the normal gear ratio map of FIG. 3, the limp mode gear ratio map of FIG. 8 is set such that the target gear ratio when the accelerator pedal opening degree is relatively small becomes greater as a whole. As a result, the engine speed during cruising of the vehicle 10 increases, and noise increases.

In step S18, the engine control unit 50 limits the engine torque. Thereafter, the belt condition determination process is terminated. FIG. 9 is an engine torque map. The engine control unit 50 controls the engine 12 and thereby causes the engine 12 to output an engine torque corresponding to the accelerator pedal opening degree. Normally, the engine control unit 50 causes the engine 12 to output an engine torque indicated by a solid line in FIG. 9. On the other hand, when the engine torque is limited, the engine 12 is caused to output an engine torque indicated by a dashed dotted line in FIG. 9. As a result, the engine torque when the accelerator pedal is depressed decreases, and the acceleration of the vehicle 10 is suppressed.

In addition to the steps S17 and S18 described above, a lamp may be turned on to indicate that a malfunction has occurred in the belt-type continuously variable transmission 16 or the engine 12. The lamp is provided on an instrumental panel or the like.

When it is determined in step S14 that the drive pulley hydraulic pressure is less than the predetermined hydraulic pressure, or when it is determined in step S15 that the reference gear ratio is less than the predetermined gear ratio, the process proceeds to step S19. In step S19, the condition determination unit 64 determines that the condition of the belt 28 is the normal condition. Thereafter, the process proceeds to step S20.

In step S20, the condition determination unit 64 resets the timer. Thereafter, the belt condition determination process is terminated.

If it is determined in step S11 that the target gear ratio is not the minimum gear ratio, the process proceeds to step S21. In step S21, the condition determination unit 64 determines that the target gear ratio is outside the region for belt condition determination. Thereafter, the process proceeds to step S22.

In step S22, the condition determination unit 64 resets the timer. Thereafter, the belt condition determination process is terminated.

[Relationship between Missing of Rings and Gear Ratio]

Figure 10A:
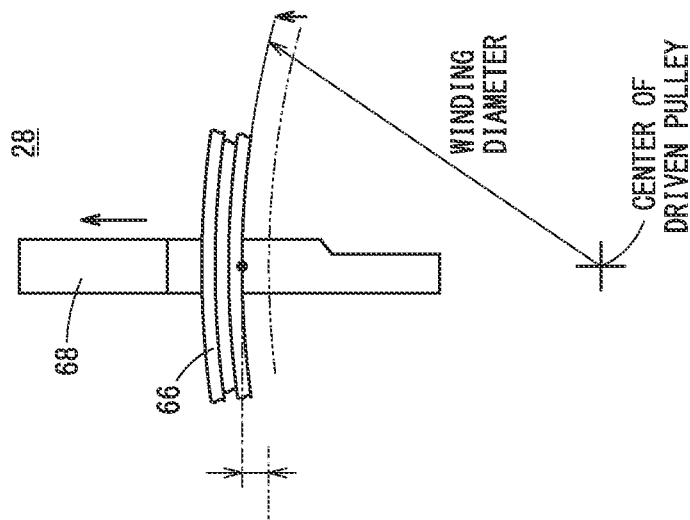
FIGS. 10A, 10B, and 10C are schematic diagrams of the belt.
Figure 10B:
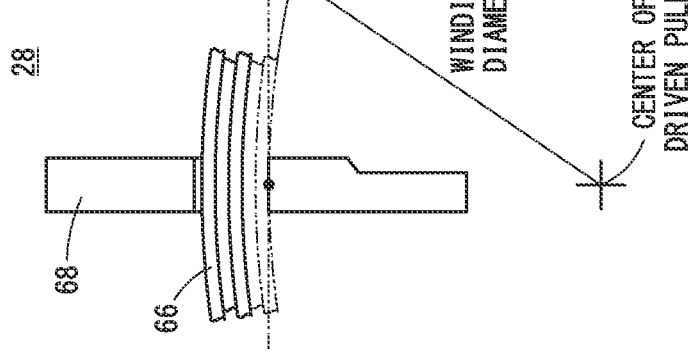
Figure 10C:
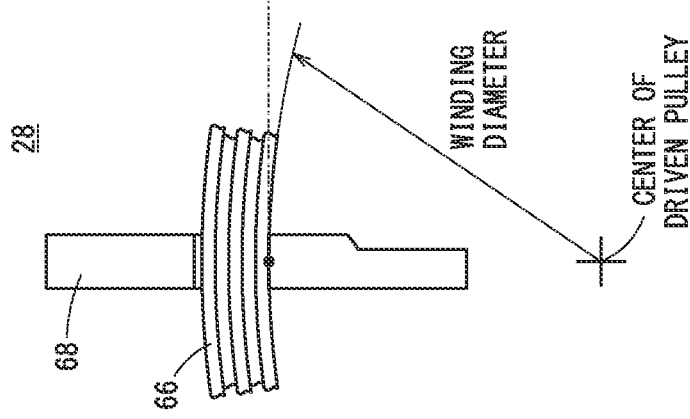

FIGS. 10A, 10B, and 10C are schematic diagrams of the belt 28. FIGS. 11A and 11B are schematic diagrams of the drive pulley 24, the driven pulley 26, and the belt 28.

The belt 28 has rings 66 each made of a thin sheet of special steel and elements 68 combined with the rings 66. The rings 66 are laminated in a multiple-layered manner. Although FIG. 10A shows five layers of the rings 66, nine to twelve layers of the rings 66 are actually laminated.

The elements 68 are pressed toward the outer periphery by the drive pulley 24 and the driven pulley 26. Therefore, as shown in FIG. 10B, the ring 66 on the inner peripheral side may break and fall off. When the ring 66 on the inner peripheral side falls off, the elements 68 move to the outer peripheral side as shown in FIG. 10C, and the circumferential length of the belt 28 increases. When the target gear ratio is set to the minimum gear ratio, the drive pulley 24 is set such that the groove width between the fixed sheave 24a and the movable sheave 24b is minimized. Therefore, even if the circumferential length of the belt 28 becomes long, the winding diameter of the belt 28 of the drive pulley 24 does not change. However, as the circumferential length of the belt 28 increases, the winding diameter of the belt 28 of the driven pulley 26 increases. Therefore, the gear ratio of the belt-type continuously variable transmission 16 increases, and even if the target gear ratio is set to the minimum gear ratio, the belt-type continuously variable transmission 16 cannot achieve the minimum gear ratio.

[Operational Effects]

Even if the groove width between the fixed sheave 24a and the movable sheave 24b of the drive pulley 24 is constant, the gear ratio of the belt-type continuously variable transmission 16 fluctuates mainly due to the following four factors. The four factors are product variation of the belt-type continuously variable transmission 16, wear of the element 68, driven pulley hydraulic pressure, and input torque to the belt-type continuously variable transmission 16.

Hereinafter, when the groove width between the fixed sheave 24a and the movable sheave 24b of the drive pulley 24 is constant, the difference between the maximum value and the minimum value of the gear ratio which fluctuates is referred to as a fluctuation range. FIG. 12 is a schematic diagram showing a comparison between a fluctuation range of an actual gear ratio and a fluctuation range of a reference gear ratio. FIG. 12 shows the fluctuation range when the groove width between the fixed sheave 24a and the movable sheave 24b of the drive pulley 24 of the belt-type continuously variable transmission 16 is minimum, that is, when the target gear ratio is the minimum gear ratio.

Because of the large fluctuation range of the actual gear ratio, it was not possible to set, for the actual gear ratio, a predetermined gear ratio which can be used to properly determine whether the condition of the belt 28 is in the normal condition or in the missing condition. As such, in the present embodiment, the reference gear ratio calculation unit 62 modifies the actual gear ratio and thereby calculates (obtains) the reference gear ratio having a smaller fluctuation range than the actual gear ratio. Then, the condition determination unit 64 performs the belt condition determination process by using a predetermined gear ratio set for the reference gear ratio.

Of the above-described four factors that cause the fluctuation of the gear ratio of the belt-type continuously variable transmission 16, the magnitude of the product variation of the belt-type continuously variable transmission 16 and the wear amount of the element 68 cannot be acquired immediately. Therefore, while the vehicle 10 is traveling, it is difficult to estimate the amount of change in the gear ratio that is caused by the magnitude of product variation of the belt-type continuously variable transmission 16 and wear of the element 68. On the other hand, the driven pulley hydraulic pressure and the input torque can be acquired even while the vehicle 10 is traveling. Therefore, the amount of change in the gear ratio that is caused by the driven pulley hydraulic pressure and the input torque can be estimated to some extent.

The reference gear ratio calculation unit 62 of the present embodiment searches the correction value map shown in FIG. 5 for a correction value corresponding to the input torque and the driven pulley hydraulic pressure. This correction value is an estimated value of an amount of change of the gear ratio of the belt-type continuously variable transmission 16 which is caused by the driven pulley hydraulic pressure and the input torque. The reference gear ratio calculation unit 62 modifies the actual gear ratio with the correction value, i.e., subtracts, from the actual gear ratio, the amount of change of the actual gear ratio which is estimated to be caused by the driven pulley hydraulic pressure and the input torque, to thereby obtain a reference gear ratio. That is, it can be said that the reference gear ratio is an estimated value of the gear ratio of the belt-type continuously variable transmission 16 when the driven pulley hydraulic pressure is 0 [MPa] and the input torque is 0 [Nm]. It might be difficult to highly accurately estimate the gear ratio of the belt-type continuously variable transmission 16 that will occur when the driven pulley hydraulic pressure is 0 [MPa] and the input torque is 0 [Nm]. Therefore, the reference gear ratio also fluctuates depending on the driven pulley hydraulic pressure and the input torque. However, as shown in FIG. 12, the fluctuation range due to the driven pulley hydraulic pressure and the input torque at the reference gear ratio can be made smaller than the fluctuation range due to the driven pulley hydraulic pressure and the input torque at the actual gear ratio.

Figure 13:
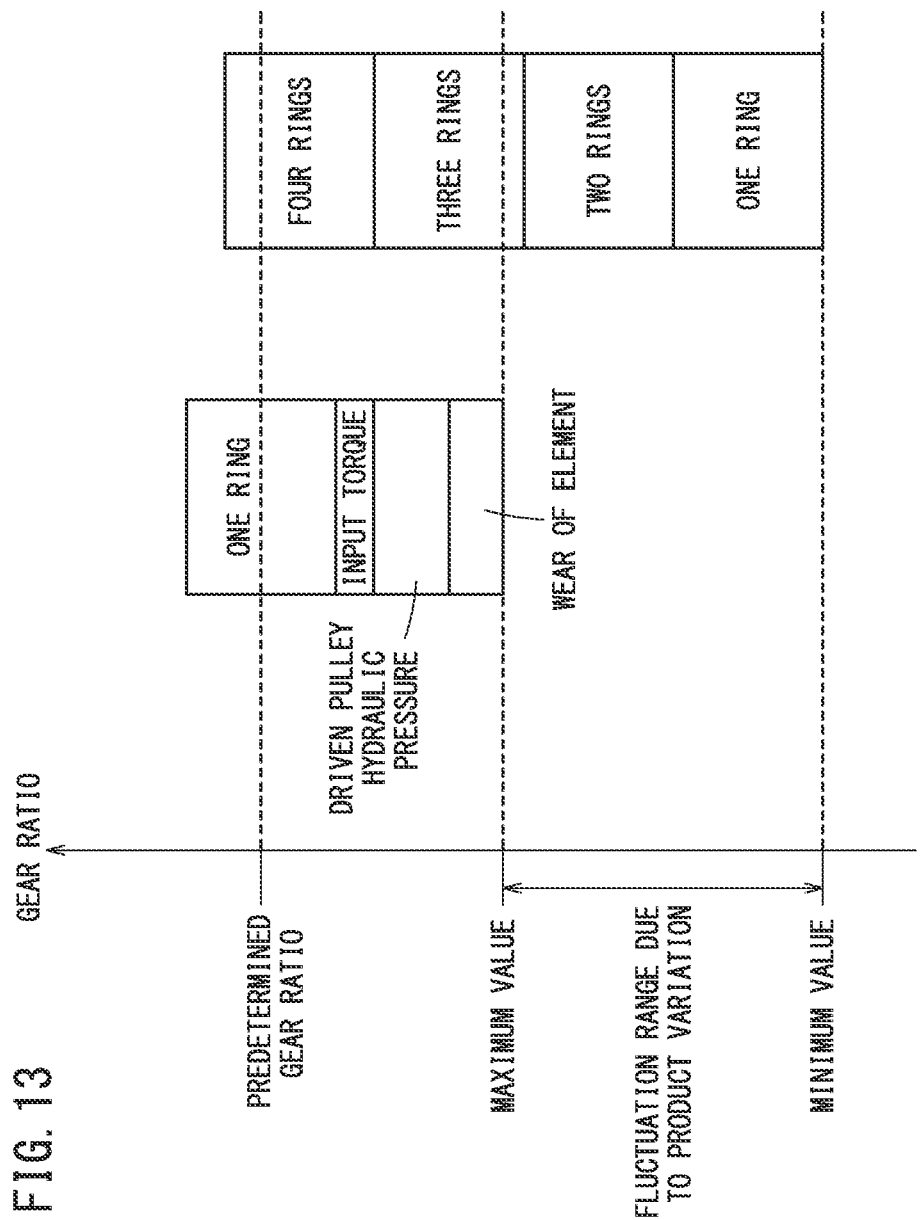
FIG. 13 is a diagram illustrating a method of setting a predetermined gear ratio for determining a belt condition.

FIG. 13 is a diagram illustrating a method of setting a predetermined gear ratio for determining the condition of the belt. FIG. 13 shows the maximum and minimum values of the reference gear ratio which fluctuates due to product variations of the belt-type continuously variable transmission 16 when there is no wear of the element 68, the driven pulley hydraulic pressure is 0 [MPa], and the input torque is 0 [Nm]. FIG. 13 also shows a predetermined gear ratio for determining the belt condition. FIG. 13 shows the maximum value and the minimum value of the reference gear ratio when the groove width between the fixed sheave 24a and the movable sheave 24b of the drive pulley 24 of the belt-type continuously variable transmission 16 is minimum, that is, when the target gear ratio is the minimum gear ratio.

The predetermined gear ratio is set such that a value obtained in the following manner cannot exceed the predetermined gear ratio. The value is obtained by adding the fluctuation range of the reference gear ratio caused by wear of the element 68, the fluctuation range thereof caused by the driven pulley hydraulic pressure, and the fluctuation range thereof caused by the input torque, to the maximum value of the reference gear ratio which fluctuates due to the product variation of the belt-type continuously variable transmission 16. Further, the predetermined gear ratio is set such that the predetermined gear ratio is exceeded when the fluctuation range of the reference gear ratio caused by the loss of one ring 66 is further added to the value obtained in the above manner. Further, the predetermined gear ratio is set such that the predetermined gear ratio is exceeded by a value obtained by adding the fluctuation range of the reference gear ratio caused by the loss of four rings 66 to the minimum value of the reference gear ratio which fluctuates due to the product variation of the belt-type continuously variable transmission 16.

As a result, unless loss of the ring 66 occurs, the reference gear ratio does not become greater than or equal to the predetermined gear ratio. Therefore, it is possible to prevent the condition determination unit 64 from erroneously determining that the condition of the belt 28 is in a missing condition. When at least four rings 66 are lost, the reference gear ratio is equal to or greater than the predetermined gear ratio. Therefore, in a state in which the vehicle 10 is able to travel, the condition determination unit 64 can determine that the condition of the belt 28 is in the missing condition.

Further, in the belt-type continuously variable transmission 16 of the present embodiment, the target gear ratio setting unit 56 sets the target gear ratio based on the normal gear ratio map shown in FIG. 3. When determining the condition of the belt 28, the target gear ratio setting unit 56 sets the target gear ratio based on the gear ratio map for determination of FIG. 4. In the normal gear ratio map of FIG. 3, even the smallest target gear ratio is set to a gear ratio greater than the minimum gear ratio. At the minimum gear ratio, bending stress acts excessively on the belt 28, and a large load is applied to the belt 28. Since the minimum gear ratio is not set to the target gear ratio in the normal gear ratio map, deterioration of the belt 28 can be suppressed.

In the belt-type continuously variable transmission 16 of the present embodiment, when the condition determination unit 64 determines that the belt condition is in a missing condition, the target gear ratio setting unit 56 sets the target gear ratio based on the limp mode gear ratio map shown in FIG. 8. As a result, it is possible to increase noise of the vehicle 10 during cruising, and it is possible to cause the user to recognize that some kind of malfunction has occurred in the vehicle 10.

Further, in the belt-type continuously variable transmission 16 of the present embodiment, when the condition determination unit 64 determines that the belt condition is in the missing condition, the engine control unit 50 controls the engine 12 to suppress the engine torque when the accelerator pedal is depressed. As a result, the acceleration of the vehicle 10 is suppressed, and it is possible to cause the user to recognize that some kind of malfunction has occurred in the vehicle 10.

Second Embodiment

Figure 14:
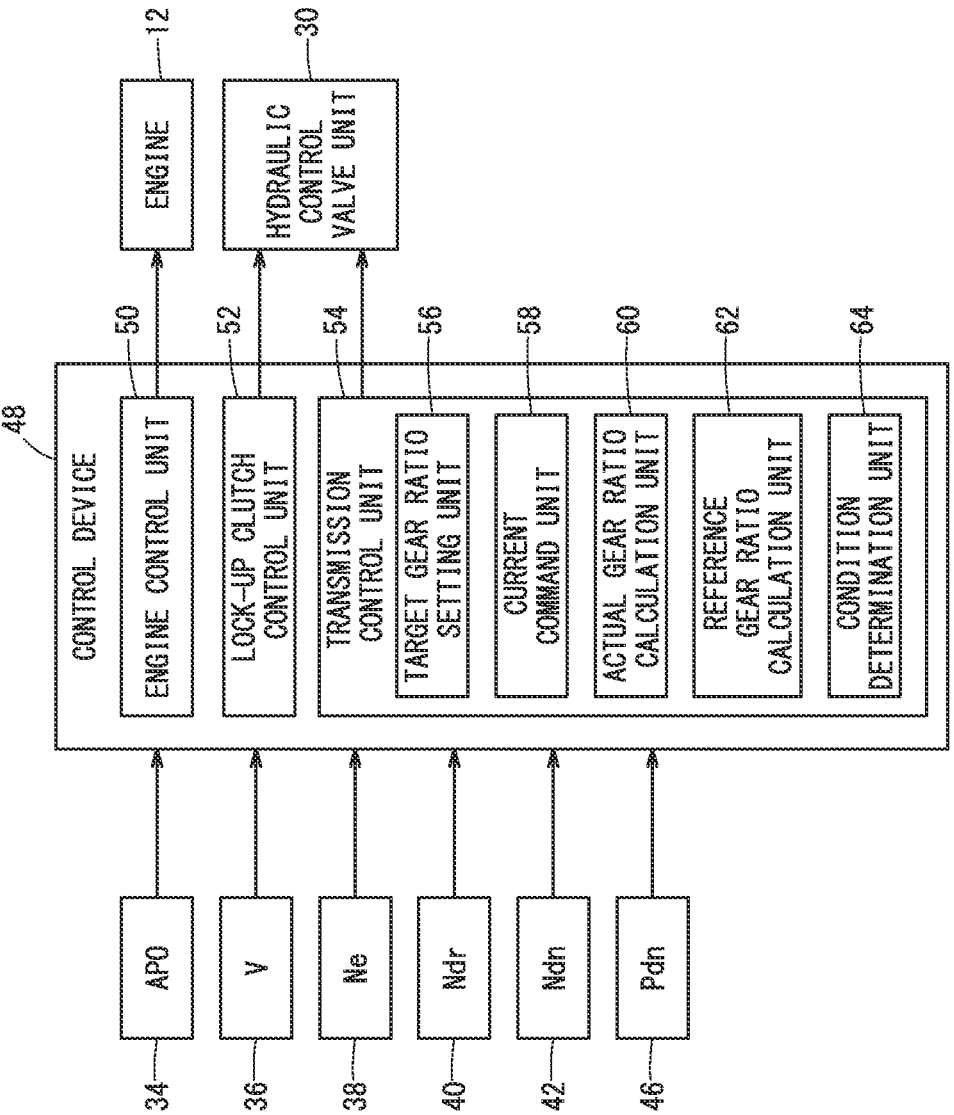
FIG. 14 is a block diagram showing a configuration of a control system of the vehicle.

The second embodiment is partially different from the first embodiment in the configuration of the control system of the vehicle 10. FIG. 14 is a block diagram showing a configuration of a control system of the vehicle 10. As shown in FIG. 14, the vehicle 10 of the second embodiment does not include the drive pulley hydraulic pressure sensor 44. The other components of the vehicle 10 of the second embodiment are the same as the components of the vehicle 10 of the first embodiment.

[Belt Condition Determination Process]

The second embodiment is partially different from the first embodiment in the contents of the belt condition determination process.

Figure 15:
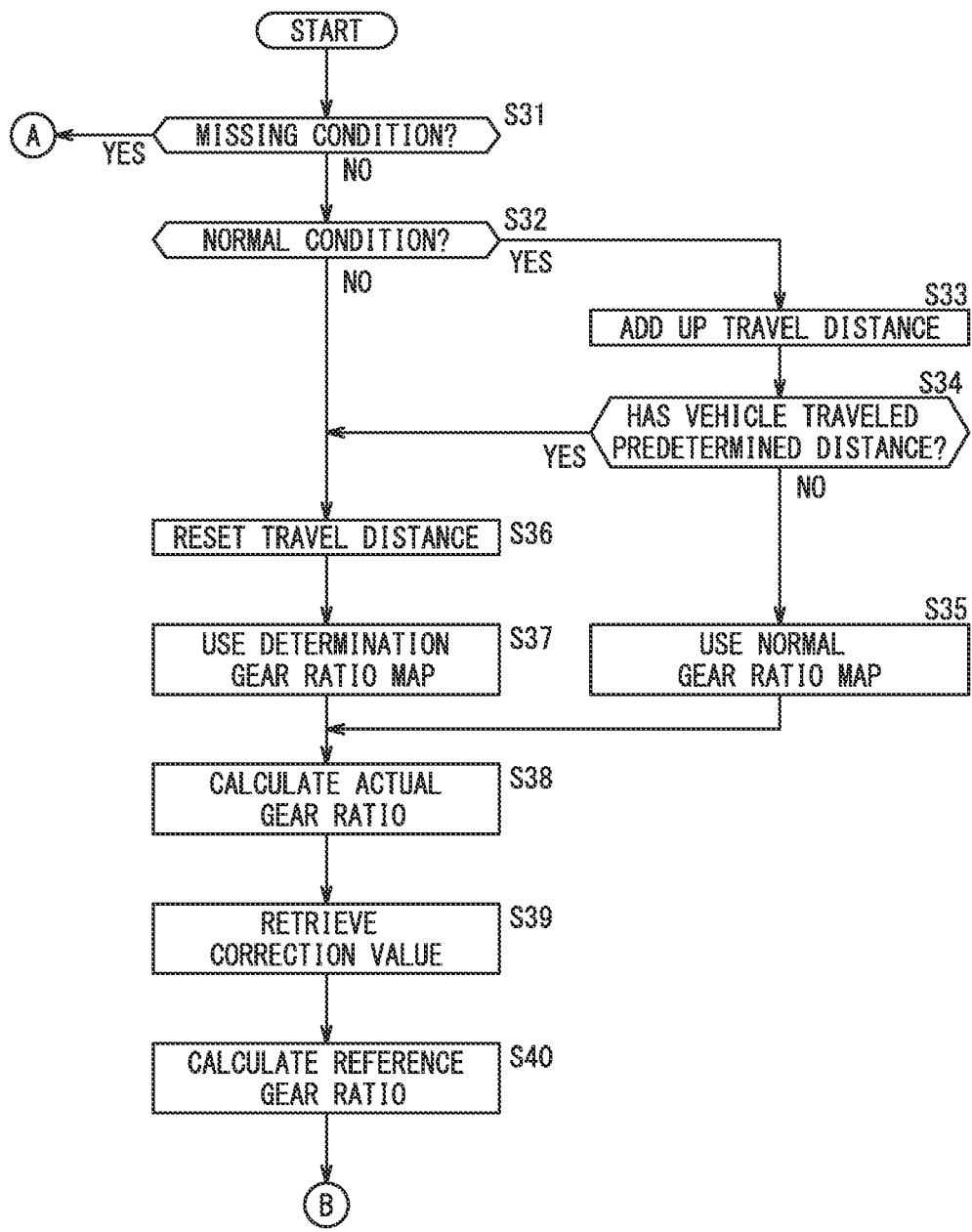
FIG. 15 is a flowchart illustrating a belt condition determination process performed by the control device.
Figure 16:
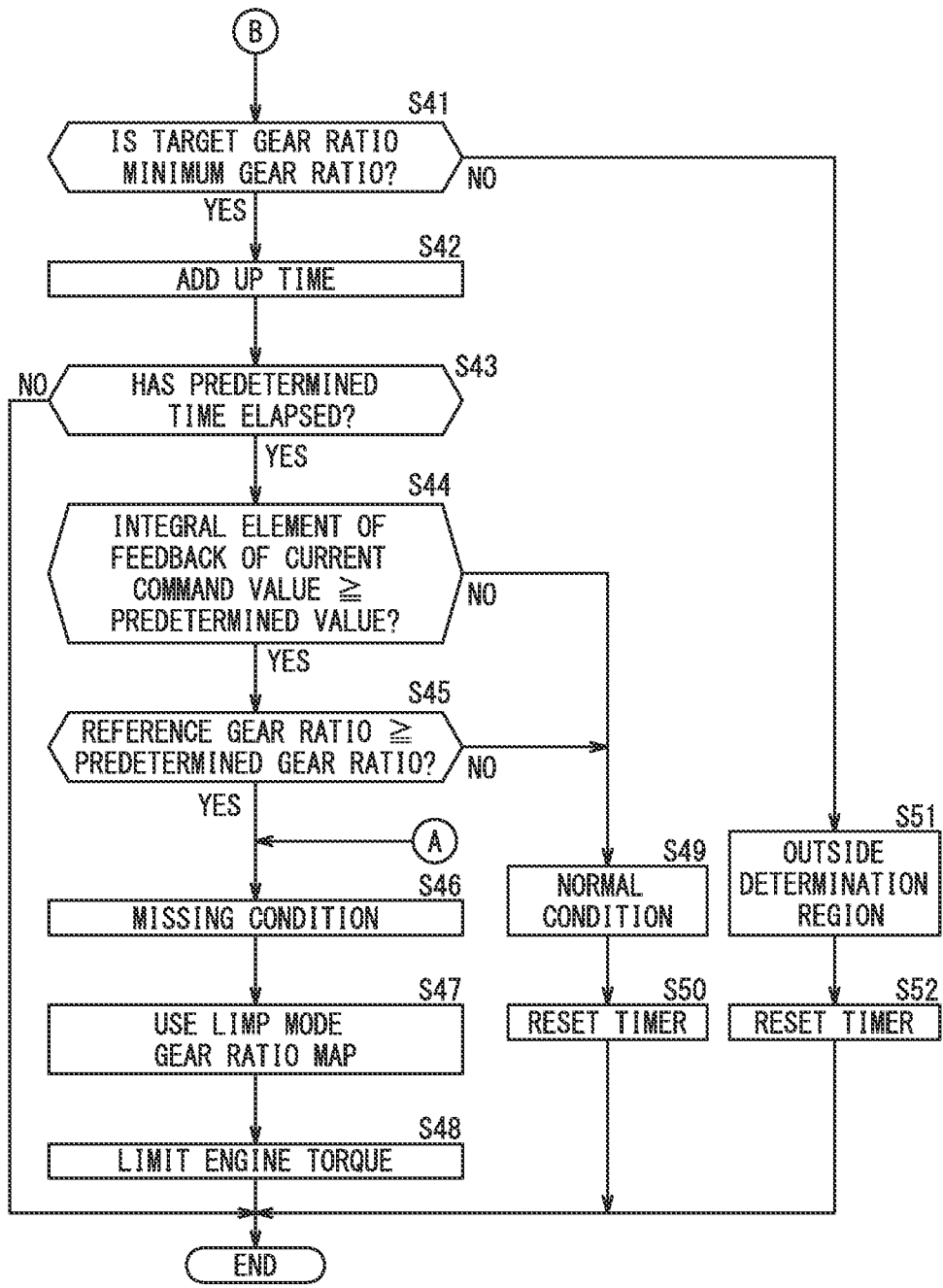
FIG. 16 is a flowchart illustrating a belt condition determination process performed by the control device.

FIGS. 15 and 16 are flowcharts showing the belt condition determination process performed by the control device 48. The belt condition determination process is repeatedly executed at a predetermined cycle during an ON state of a start switch for starting the vehicle 10 or an ignition switch for starting the engine 12.

In step S31, the condition determination unit 64 determines whether or not the previous belt condition determination process determined that the condition of the belt 28 was in a missing condition. When it is determined that the belt condition is in a missing condition, the process proceeds to step S46. When it is not determined that the belt condition is in a missing condition, the process proceeds to step S32. That the previous belt condition determination process determined that the condition of the belt 28 was in a missing condition indicates that the previous belt condition determination process performed a process of step S46 described later.

In step S32, the condition determination unit 64 determines whether or not the previous belt condition determination process determined that the condition of the belt 28 was in a normal condition. When the previous process determined that the belt condition was in the normal condition, the process proceeds to step S33, and when the previous process did not determine that the belt condition was in the normal condition, the process proceeds to step S36. That the previous belt condition determination process determined that the condition of the belt 28 was in the normal condition indicates that the previous belt condition determination process performed a process of step S49 described later.

In step S33, the condition determination unit 64 accumulates (adds up) the travel distance of the vehicle 10 from the previous belt condition determination process up to the current belt condition determination process. Thereafter, the process proceeds to step S34.

In step S34, the condition determination unit 64 determines whether or not the vehicle 10 has traveled a predetermined distance. The process proceeds to step S36 when the vehicle 10 has traveled the predetermined distance, and when the vehicle 10 has not traveled the predetermined distance, the process proceeds to step S35. Whether or not the vehicle 10 has traveled the predetermined distance is determined based on the travel distance accumulated after reset of the travel distance in step S36 described later.

In step S35, the target gear ratio setting unit 56 sets the gear ratio map to be used, to the normal gear ratio map. Thereafter, the process proceeds to step S38.

In step S36, the condition determination unit 64 resets the travel distance of the vehicle 10. Thereafter, the process proceeds to step S37.

In step S37, the target gear ratio setting unit 56 sets the gear ratio map to be used, to the gear ratio map for determination. Thereafter, the process proceeds to step S38.

In step S38, the actual gear ratio calculation unit 60 calculates the actual gear ratio of the belt-type continuously variable transmission 16 based on the drive pulley rotation speed and the driven pulley rotation speed. Thereafter, the process proceeds to step S39.

In step S39, the reference gear ratio calculation unit 62 retrieves a correction value corresponding to the input torque input to the belt-type continuously variable transmission 16 and the driven pulley hydraulic pressure, from the correction value map shown in FIG. 5. Thereafter, the process proceeds to step S40.

In step S40, the reference gear ratio calculation unit 62 calculates the reference gear ratio based on the actual gear ratio of the belt-type continuously variable transmission 16 and the correction value. Thereafter, the process proceeds to step S41.

In step S41, the condition determination unit 64 determines whether or not the target gear ratio is the minimum gear ratio. When the target gear ratio is the minimum gear ratio, the process proceeds to step S42. When the target gear ratio is not the minimum gear ratio, the process proceeds to step S51.

In step S42, the condition determination unit 64 accumulates (adds up), in a timer, the time from the previous belt condition determination process up to the current belt condition determination process. Thereafter, the process proceeds to step S43.

In step S43, the condition determination unit 64 determines whether or not a predetermined time has elapsed. Whether or not the predetermined time has elapsed is determined based on an elapsed time after reset of the timer in step S50 or step S52 described later. When the predetermined time has elapsed, the process proceeds to step S44. When the predetermined time has not elapsed, the belt condition determination process is terminated.

In step S44, the condition determination unit 64 determines whether or not the integral element of the feedback is greater than or equal to a predetermined value (i.e., whether the integral element Z the predetermined value), of the current command value that the current command unit 58 outputs to the hydraulic control valve unit 30 to control the drive pulley hydraulic pressure. When the integral element of the feedback is equal to or greater than the predetermined value, the process proceeds to step S45. When the integral element of the feedback is less than the predetermined value, the process proceeds to step S49.

The current command unit 58 outputs a current command value to the hydraulic control valve unit 30 in order to control the drive pulley hydraulic pressure. Therefore, instead of the processing based on the drive pulley hydraulic pressure directly detected by the drive pulley hydraulic pressure sensor 44 as in the first embodiment, the processing based on the current command value is performed in the second embodiment.

The state in which the integral element of the feedback of the current command value is equal to or greater than the predetermined value indicates a state in which the actual gear ratio cannot achieve the minimum gear ratio that is the target gear ratio and the integral element is accumulated. At this time, the drive pulley hydraulic pressure is equal to or higher than the predetermined hydraulic pressure.

In step S45, the condition determination unit 64 determines whether or not the reference gear ratio is greater than or equal to the predetermined gear ratio. If the reference gear ratio is greater than or equal to the predetermined gear ratio, the process proceeds to step S46. If the reference gear ratio is less than the predetermined gear ratio, the process proceeds to step S49.

In step S46, the condition determination unit 64 determines that the condition of the belt 28 is in the missing condition. Thereafter, the process proceeds to step S47.

In step S47, the target gear ratio setting unit 56 sets the target gear ratio using the limp mode gear ratio map. Thereafter, the process proceeds to step S48.

In step S48, the engine control unit 50 limits the engine torque. Thereafter, the belt condition determination process is terminated.

When it is determined in step S44 that the integral element of the feedback is less than the predetermined value, or when it is determined in step S45 that the reference gear ratio is less than the predetermined gear ratio, the process proceeds to step S49. In step S49, the condition determination unit 64 determines that the condition of the belt 28 is the normal condition. Thereafter, the process proceeds to step S50.

In step S50, the condition determination unit 64 resets the timer. Thereafter, the belt condition determination process is terminated.

If it is determined in step S41 that the target gear ratio is not the minimum gear ratio, the process proceeds to step S51. In step S51, the condition determination unit 64 determines that the target gear ratio is outside the region for belt condition determination. Thereafter, the process proceeds to step S52.

In step S52, the condition determination unit 64 resets the timer. Thereafter, the belt condition determination process is terminated.

[Operational Effects]

In the present embodiment, when the target gear ratio is the minimum gear ratio, the condition determination unit 64 determines that at least part of the rings 66 of the belt 28 is missing if the reference gear ratio is greater than or equal to the predetermined gear ratio and the integral element of feedback is greater than or equal to a predetermined value, among the current command values output by the current command unit 58 to the hydraulic control valve unit 30 to control the drive pulley hydraulic pressure. Thus, the missing of the ring 66 of the belt 28 can be determined without providing a sensor for directly detecting the drive pulley hydraulic pressure.

OTHER EMBODIMENTS

Although preferred embodiments of the present invention have been described above, the present invention is not limited to the above-described embodiments, and various modifications can be made without departing from the scope of the present invention.

In the above embodiment, when the condition determination of the belt 28 is not performed, the target gear ratio setting unit 56 sets the target gear ratio using the normal gear ratio map of FIG. 3. In the normal gear ratio map, the target gear ratio does not include the minimum gear ratio. Even when the condition of the belt 28 is not determined, the target gear ratio setting unit 56 may use the determination gear ratio map of FIG. 4 as the normal gear ratio map to set the target gear ratio. In the determination gear ratio map, the target gear ratio includes the minimum gear ratio. As a result, the fuel efficiency of the vehicle 10 during cruising can be improved, and noise can be reduced.

In the above embodiment, the reference gear ratio calculation unit 62 calculates the reference gear ratio based on the driven pulley hydraulic pressure detected by the driven pulley hydraulic pressure sensor 46. Instead of the driven pulley hydraulic pressure detected by the driven pulley hydraulic pressure sensor 46, the driven pulley hydraulic pressure obtained from the current command value (command value of the driven pulley hydraulic pressure) output from the current command unit 58 to the hydraulic control valve unit 30 to control the driven pulley hydraulic pressure may be used. This allows the reference gear ratio calculation unit 62 to calculate the reference gear ratio without the need to install a sensor that directly detects the driven pulley hydraulic pressure.

INVENTION OBTAINED FROM EMBODIMENTS

The inventions that are capable of being grasped from the above-described embodiment will be mentioned below.

According to the first aspect of the present invention, there is provided a vehicular continuously variable transmission (16) that continuously varies a gear ratio of the vehicle by varying a winding diameter of a belt (28) wound around a drive pulley (24) and a driven pulley (26), the vehicular continuously variable transmission including: a target gear ratio setting unit (56) configured to set a target gear ratio; a gear ratio control unit (58) configured to output a command value of a drive pulley hydraulic pressure supplied to the drive pulley and a command value of a driven pulley hydraulic pressure supplied to the driven pulley, based on an input torque input to the vehicular continuously variable transmission and the target gear ratio; a hydraulic pressure detecting unit (46) configured to detect the driven pulley hydraulic pressure; a first rotation speed detecting unit (40) configured to detect a rotation speed of the drive pulley; a second rotation speed detecting unit (42) configured to detect a rotation speed of the driven pulley; an actual gear ratio calculation unit (60) configured to calculate an actual gear ratio based on the drive pulley rotation speed and the driven pulley rotation speed; a reference gear ratio calculation unit (62) configured to calculate a reference gear ratio by modifying the actual gear ratio, based on the input torque and the driven pulley hydraulic pressure; and a condition determination unit (64) configured to, in a case where the target gear ratio is an overdrive gear ratio, determine that at least part of rings (66) of the belt is missing when the reference gear ratio is equal to or greater than a predetermined gear ratio and the drive pulley hydraulic pressure is equal to or greater than a first predetermined hydraulic pressure.

In the above vehicular continuously variable transmission according to the first aspect of the present invention, the reference gear ratio calculation unit may calculate the reference gear ratio by modifying the actual gear ratio to a gear ratio occurring when the input torque is a predetermined torque and the driven pulley hydraulic pressure is a second predetermined hydraulic pressure.

In the above vehicular continuously variable transmission according to the first aspect of the present invention, when the condition determination unit performs a determination on whether at least part of the rings of the belt is missing, the target gear ratio setting unit may set the target gear ratio to a gear ratio including a minimum gear ratio of the vehicular continuously variable transmission, and when the condition determination unit does not perform the determination, the target gear ratio setting unit may set the target gear ratio to a gear ratio greater than the minimum gear ratio, and in a case where the target gear ratio is the minimum gear ratio, the condition determination unit may determine that at least part of the rings is missing when the reference gear ratio is equal to or greater than the predetermined gear ratio and the drive pulley hydraulic pressure is equal to or greater than the first predetermined hydraulic pressure.

In the above vehicular continuously variable transmission according to the first aspect of the present invention, when it is determined that at least part of the rings is missing, the target gear ratio setting unit may set the target gear ratio during cruising of the vehicle to a gear ratio greater than that before it is determined that at least part of the rings is missing.

According to the second aspect of the present invention, there is provided a vehicle (10) including the vehicular continuously variable transmission described above, the vehicle including: an engine control unit (50) configured to control engine torque output from an engine (12), in accordance with an accelerator pedal opening degree, wherein, in a case where it is determined that at least part of the rings is missing, the engine control unit controls the engine torque during acceleration of the vehicle to be smaller than that before it is determined that at least part of the rings is missing.

According to the third aspect of the present invention, there is provided a method of controlling a vehicular continuously variable transmission that continuously varies a gear ratio of the vehicle by varying a winding diameter of a belt wound around a drive pulley and a driven pulley. The vehicular continuously variable transmission includes: a hydraulic pressure detecting unit configured to detect a driven pulley hydraulic pressure supplied to the driven pulley; a first rotation speed detecting unit configured to detect a rotation speed of the drive pulley; a second rotation speed detecting unit configured to detect a rotation speed of the driven pulley. The method includes: setting a target gear ratio; outputting a command value of a drive pulley hydraulic pressure supplied to the drive pulley and a command value of the driven pulley hydraulic pressure based on an input torque input to the vehicular continuously variable transmission and the target gear ratio; calculating an actual gear ratio based on the rotation speed of the drive pulley and the rotation speed of the driven pulley; calculating a reference gear ratio by modifying the actual gear ratio based on the input torque and the driven pulley hydraulic pressure; and in a case where the target gear ratio is an overdrive gear ratio, determining that at least part of rings of the belt is missing when the reference gear ratio is equal to or greater than a predetermined gear ratio and the drive pulley hydraulic pressure is equal to or greater than a first predetermined hydraulic pressure.

What is claimed is:

1. A vehicular continuously variable transmission that continuously varies a gear ratio of a vehicle by varying a winding diameter of a belt wound around a drive pulley and a driven pulley, the vehicular continuously variable transmission comprising:
- a target gear ratio setting unit configured to set a target gear ratio;
- a gear ratio control unit configured to output a command value of a drive pulley hydraulic pressure supplied to the drive pulley and a command value of a driven pulley hydraulic pressure supplied to the driven pulley, based on an input torque input to the vehicular continuously variable transmission and the target gear ratio;
- a hydraulic pressure detecting unit configured to detect the driven pulley hydraulic pressure;
- a first rotation speed detecting unit configured to detect a rotation speed of the drive pulley;
- a second rotation speed detecting unit configured to detect a rotation speed of the driven pulley;
- an actual gear ratio calculation unit configured to calculate an actual gear ratio based on the rotation speed of the drive pulley and the rotation speed of the driven pulley;
- a reference gear ratio calculation unit configured to calculate a reference gear ratio by modifying the actual gear ratio, based on the input torque and the driven pulley hydraulic pressure; and
- a condition determination unit configured to, in a case where the target gear ratio is an overdrive gear ratio, determine that at least part of rings of the belt is missing when the reference gear ratio is equal to or greater than a predetermined gear ratio and the drive pulley hydraulic pressure is equal to or greater than a first predetermined hydraulic pressure.

2. The vehicular continuously variable transmission according to claim 1, wherein
the reference gear ratio calculation unit calculates the reference gear ratio by modifying the actual gear ratio to a gear ratio occurring when the input torque is a predetermined torque and the driven pulley hydraulic pressure is a second predetermined hydraulic pressure.

3. The vehicular continuously variable transmission according to claim 2, wherein
when the condition determination unit performs a determination on whether at least part of the rings of the belt is missing, the target gear ratio setting unit sets the target gear ratio to a gear ratio including a minimum gear ratio of the vehicular continuously variable transmission, and when the condition determination unit does not perform the determination, the target gear ratio setting unit sets the target gear ratio to a gear ratio greater than the minimum gear ratio, and
in a case where the target gear ratio is the minimum gear ratio, the condition determination unit determines that at least part of the rings is missing when the reference gear ratio is equal to or greater than the predetermined gear ratio and the drive pulley hydraulic pressure is equal to or greater than the first predetermined hydraulic pressure.

4. The vehicular continuously variable transmission according to claim 3, wherein
when it is determined that at least part of the rings is missing, the target gear ratio setting unit sets the target gear ratio during cruising of the vehicle to a gear ratio greater than that before it is determined that at least part of the rings is missing.

5. A vehicle including the vehicular continuously variable transmission according to claim 4, the vehicle comprising:
an engine control unit configured to control an engine torque output from an engine, in accordance with an accelerator pedal opening degree,
wherein, in a case where it is determined that at least part of the rings is missing, the engine control unit controls the engine torque during acceleration of the vehicle to be smaller than that before it is determined that at least part of the rings is missing.

6. The vehicular continuously variable transmission according to claim 1, wherein
when the condition determination unit performs a determination on whether at least part of the rings of the belt is missing, the target gear ratio setting unit sets the target gear ratio to a gear ratio including a minimum gear ratio of the vehicular continuously variable transmission, and when the condition determination unit does not perform the determination, the target gear ratio setting unit sets the target gear ratio to a gear ratio greater than the minimum gear ratio, and
in a case where the target gear ratio is the minimum gear ratio, the condition determination unit determines that at least part of the rings is missing when the reference gear ratio is equal to or greater than the predetermined gear ratio and the drive pulley hydraulic pressure is equal to or greater than the first predetermined hydraulic pressure.

7. The vehicular continuously variable transmission according to claim 1, wherein
when it is determined that at least part of the rings is missing, the target gear ratio setting unit sets the target gear ratio during cruising of the vehicle to a gear ratio greater than that before it is determined that at least part of the rings is missing.

8. A vehicle including the vehicular continuously variable transmission according to claim 1, the vehicle comprising:
an engine control unit configured to control an engine torque output from an engine, in accordance with an accelerator pedal opening degree,
wherein, in a case where it is determined that at least part of the rings is missing, the engine control unit controls the engine torque during acceleration of the vehicle to be smaller than that before it is determined that at least part of the rings is missing.

9. A method of controlling a vehicular continuously variable transmission that continuously varies a gear ratio of a vehicle by varying a winding diameter of a belt wound around a drive pulley and a driven pulley,
wherein the vehicular continuously variable transmission includes:
- a hydraulic pressure detecting unit configured to detect a driven pulley hydraulic pressure supplied to the driven pulley;
- a first rotation speed detecting unit configured to detect a rotation speed of the drive pulley;
- a second rotation speed detecting unit configured to detect a rotation speed of the driven pulley, the method comprising:
setting a target gear ratio;
outputting a command value of a drive pulley hydraulic pressure supplied to the drive pulley and a command value of the driven pulley hydraulic pressure based on an input torque input to the vehicular continuously variable transmission and the target gear ratio;
calculating an actual gear ratio based on the rotation speed of the drive pulley and the rotation speed of the driven pulley;

calculating a reference gear ratio by modifying the actual gear ratio based on the input torque and the driven pulley hydraulic pressure; and in a case where the target gear ratio is an overdrive gear ratio, determining that at least part of rings of the belt is missing when the reference gear ratio is equal to or greater than a predetermined gear ratio and the drive pulley hydraulic pressure is equal to or greater than a first predetermined hydraulic pressure.

* * * * *